US012592992B2

(12) United States Patent
Wang

(10) Patent No.: US 12,592,992 B2
(45) Date of Patent: Mar. 31, 2026

(54) INCOMING CALL REMINDER SYSTEM AND METHOD AND ELECTRONIC DEVICE UTILIZING VIBRATION OR RINGING REMINDER

(71) Applicant: Honor Device Co., Ltd., Shenzhen (CN)

(72) Inventor: Lei Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 462 days.

(21) Appl. No.: 18/256,086

(22) PCT Filed: Jan. 4, 2023

(86) PCT No.: PCT/CN2023/070551
§ 371 (c)(1),
(2) Date: Jun. 6, 2023

(87) PCT Pub. No.: WO2023/207218
PCT Pub. Date: Nov. 2, 2023

(65) Prior Publication Data
US 2024/0380839 A1     Nov. 14, 2024

(30) Foreign Application Priority Data

Apr. 29, 2022    (CN) .......................... 202210474650.4

(51) Int. Cl.
*H04M 3/00*        (2024.01)
*H04M 3/42*        (2006.01)

(52) U.S. Cl.
CPC .............................. *H04M 3/42263* (2013.01)

(58) Field of Classification Search
CPC .... H04M 3/42263; H04M 3/02; H04M 3/465; H04M 7/0033; H04M 19/04; H04M 1/72403; H04M 1/7243
See application file for complete search history.

(56) References Cited

U.S. PATENT DOCUMENTS 9,846,507 B2 * 12/2017 Heo ......................... G06F 3/017
9,999,019 B2 *  6/2018 Jeong .................... H04W 68/02
(Continued)

FOREIGN PATENT DOCUMENTS

CN        104270532 A      1/2015
CN        105791532 A      7/2016
(Continued)

*Primary Examiner* — Pakee Fang
(74) *Attorney, Agent, or Firm* — Conley Rose, P.C.

(57)            ABSTRACT

This application relates to the field of terminal technologies and provides an incoming call reminder system and method and an electronic device, to alleviate a problem that a plurality of devices indistinguishably perform incoming call reminding for a same incoming call request. Specific solutions are as follows: The first device receives a first incoming call request when the first device and the one or more second devices meet a first condition, where the first condition includes a screen off state; and in response to the first incoming call request, a third device in the one or more second devices and the first device perform incoming call reminding, and a fourth device other than the third device in the one or more second devices does not perform a vibration and/or ringing reminding, where the third device is a wearable device, and the third device is in a worn state.

20 Claims, 18 Drawing Sheets

(56)        References Cited

U.S. PATENT DOCUMENTS

| | | |
|---|---|---|
| 10,206,074 B2 | 2/2019 | Yovin |
| 2016/0283020 A1* | 9/2016 | Heo ...................... G06F 3/0416 |
| 2024/0422260 A1* | 12/2024 | Jin .................... H04M 3/42042 |

FOREIGN PATENT DOCUMENTS

| CN | 102970323 B | 8/2016 |
|---|---|---|
| CN | 106296135 A | 1/2017 |
| CN | 106550101 A | 3/2017 |
| CN | 111404802 A | 7/2020 |
| CN | 111835907 A | 10/2020 |
| CN | 112929481 A | 6/2021 |
| CN | 113079245 A | 7/2021 |
| CN | 113452394 A | 9/2021 |
| CN | 113905123 A | 1/2022 |
| CN | 114173204 A | 3/2022 |

* cited by examiner

INCOMING CALL REMINDER SYSTEM AND METHOD AND ELECTRONIC DEVICE UTILIZING VIBRATION OR RINGING REMINDER

CROSS-REFERENCE TO RELATED APPLICATIONS

This application is a U.S. National Stage of International Application No. PCT/CN2023/070551 filed on Jan. 4, 2023, which claims priority to Chinese Patent Application No. 202210474650.4, filed with the China National Intellectual Property Administration on Apr. 29, 2022, both of which are incorporated herein by reference in their entireties.

TECHNICAL FIELD

This application relates to the field of terminal technologies, and in particular, to an incoming call reminder system and method and an electronic device.

BACKGROUND

Currently, types and a quantity of electronic devices owned by users are increasing, for example, one user may simultaneously have three electronic devices: a smartphone, a tablet computer, and a notebook computer. In some embodiments, a web of trust may be constructed between a plurality of electronic devices of a same user. Therefore, when a single electronic device identifies a to-be-reminded event, for example, a smartphone receives an incoming call, all devices in the web of trust collaborate to perform incoming call reminding. In this way, in a scenario in which the user does not use the smartphone, a problem that the user misses an incoming call reminder is alleviated.

However, in an actual use process, in a scenario in which all the devices indistinguishably perform incoming call reminding, the user is forced to successively view all the devices to determine whether all the electronic devices perform reminding for a same incoming call. Obviously, a larger quantity of electronic devices in the web of trust indicates lower human-computer interaction efficiency of processing the incoming call reminder by the user.

SUMMARY

Embodiments of this application provide an incoming call reminder system and method and an electronic device, to resolve, in a scenario of collaborating on incoming call reminding, a problem that a plurality of devices indistinguishably perform incoming call reminding, thereby improving device intelligence.

To achieve the foregoing objective, the following technical solutions are used in embodiments of this application.

According to a first aspect, an embodiment of this application provides an incoming call reminder system. The system includes a first device, and the system further includes one or more second devices. The first device receives a first incoming call request when the first device and the one or more second devices meet a first condition, where the first condition includes a screen off state; and in response to the first incoming call request, a third device in the one or more second devices and the first device perform incoming call reminding, and a fourth device other than the third device in the one or more second devices does not perform vibration and/or ringing reminding, where the third device is a wearable device, the third device is in a worn state, and an incoming call reminder manner preconfigured in the fourth device is vibration and/or ringing.

In the foregoing embodiment, all of the first device and the second devices are in the screen off state, to indicate a scenario in which no device in the system is used. When no device in the system is used, when the first device receives the first incoming call request, the first device and the third device that is worn by a user perform incoming call reminding, and another device in the system does not perform vibration and/or ringing reminding. In this way, not only can the user be notified in a timely manner to receive the first incoming call request, but also a case in which all devices indistinguishably perform reminding does not occur, so that the user is prevented from being affected by excessive reminders and device intelligence is improved.

In some embodiments, the first device receives a second incoming call request when the first device meets a second condition, where the second condition includes: detecting a user facial feature, receiving a user operation, or being in a screen on state; and when an incoming call reminder manner preconfigured in the first device is vibration and/or ringing, in response to the second incoming call request, the first device performs reminding in the corresponding incoming call reminder manner, and the one or more second devices display incoming call notifications, and do not perform vibration and/or ringing reminding.

In some embodiments, the first device receives a third incoming call request when the first device meets a second condition, where the second condition includes: detecting a user facial feature, receiving a user operation, or being in a screen on state; and a fifth device in the one or more second devices performs incoming call reminding in response to the third incoming call request when an incoming call reminder manner preconfigured in the first device is a mute notification, where an incoming call reminder manner of the fifth device is ringing and/or vibration on ring.

In the foregoing embodiment, the first device meets the second condition, to indicate a scenario in which the user is using the first device. In this scenario, when the first device receives an incoming call request, for example, the second incoming call request or the third incoming call request, the first device mainly performs incoming call reminding, and the second device performs auxiliary reminding, to prevent a large quantity of devices from indistinguishably performing reminding.

For example, the incoming call reminder manner configured in the first device is vibration and/or ringing, and the first device vibrates and/or rings; and regardless of whether an incoming call reminder manner configured in the second device is vibration and/or ringing, the second device only displays the incoming call notification, and does not perform vibration and/or ringing reminding. For another example, the incoming call reminder manner configured in the first device is the mute notification, and the first device displays a mute notification; and the fifth device whose incoming call reminder manner is ringing and/or vibration on ring in the second devices performs incoming call reminding, in other words, the fifth device vibrates and/or rings. In this way, when the first device receives an incoming call request, it is ensured that at least one device in the system can remind, through vibration and/or ringing, the user to pay attention to the incoming call request, and a case in which all devices in the system are allowed to indistinguishably vibrate and/or ring does not occur. The user does not need to successively view all the devices to determine whether all the electronic devices perform reminding for a same incoming call, to improve human-computer interaction efficiency of processing an incoming call by the user.

In some embodiments, when there are a plurality of fifth devices, that a fifth device in the one or more second devices performs incoming call reminding includes: a sixth device with a highest priority in the plurality of fifth devices performs incoming call reminding.

In the foregoing embodiment, a priority is used to further reduce a quantity of devices performing incoming call reminding, so that it is ensured that the user is reminded in a timely manner to pay attention to an incoming call request, and human-computer interaction efficiency of processing an incoming call reminder by the user is prevented from being caused by excessively reminding the user.

In some embodiments, before the fifth device performs incoming call reminding, the fifth device determines that a third condition is not met, where the third condition includes any one of the following: running a first application in a foreground, where the first application is an application whose priority is greater than that of a call service; executing a first task, where the first task includes a collaborative task and a call task; and enabling a first function, where the first function is used to indicate to block all incoming call requests in a first time period, and a first list preconfigured in the fifth device includes the first device.

In some embodiments, the first device receives a fourth incoming call request when the first device meets the first condition and a seventh device in the one or more second devices meets a second condition, where the second condition includes: detecting a user facial feature, receiving a user operation, or being in a screen on state; and the first device and the seventh device perform incoming call reminding in response to the fourth incoming call request.

In the foregoing embodiment, the first device meets the first condition, and the seventh device in the second devices meets the second condition, to indicate a scenario in which the user does not use the first device but is using the seventh device. In this scenario, the first device receives the call request, and the seventh device may be enabled to perform incoming call reminding, to ensure that the user can be reminded in a timely manner to pay attention to the incoming call request.

In some embodiments, the first device receives a fourth incoming call request when the first device meets the first condition and a seventh device in the one or more second devices meets a second condition, where the second condition includes: detecting a user facial feature, receiving a user operation, or being in a screen on state; and the first device, the third device, and the seventh device perform incoming call reminding in response to the fourth incoming call request.

In some embodiments, an eighth device other than the seventh device and the third device in the one or more second devices displays an incoming call notification in response to the fourth incoming call request.

In some embodiments, the third device is a smartwatch or a Bluetooth headset.

In some embodiments, the first device receives a fourth incoming call request when the first device meets the first condition and a seventh device in the one or more second devices meets a second condition, where the second condition includes: detecting a user facial feature, receiving a user operation, or being in a screen on state; the first device performs incoming call reminding in response to the fourth incoming call request, the first device sends first information to the seventh device when a priority of the seventh device is greater than that of the third device, where the first information is used to indicate the seventh device to perform incoming call reminding for the fourth incoming call request; the seventh device sends first response information to the first device under a fourth condition, where the first response information is used to indicate that the seventh device refuses to perform incoming call reminding for the fourth incoming call request; the fourth condition is met when a first application runs in a foreground of the seventh device, and the first application is an application whose priority is greater than that of a call service; the fourth condition is met when the seventh device executes a first task, and the first task includes a collaborative task and a call task; the fourth condition is met when a first function is enabled on the seventh device, and the first function is used to indicate to block all incoming call requests in a first time period; and the fourth condition is met when a first list of the seventh device includes the first device; the first device sends second information to the third device in response to the first response information, where the second information is used to indicate the third device to perform incoming call reminding for the fourth incoming call request; and the third device performs incoming call reminding.

According to a second aspect, an embodiment of this application provides an incoming call reminder method, applied to a first device. The first device belongs to the system provided in the first aspect, and the method includes: the first device receives the first incoming call request; the first device sends third information to a third device in the one or more second devices when all of the first device and the one or more second devices meet a first condition, where the third information is used to indicate the third device to perform incoming call reminding for the first incoming call request, the third device is a wearable device, the third device is in a worn state, and the first condition includes a screen off state; and the first device sends fourth information to a fourth device, where the fourth information is used to indicate the fourth device to display an incoming call notification and not perform vibration and/or ringing reminding, the fourth device is a device other than the third device in the one or more second devices, and an incoming call reminder manner preconfigured in the fourth device is vibration and/or ringing.

In some embodiments, the method further includes: the first device receives the second incoming call request; the first device sends fourth information to the second device when the first device meets a second condition and a preconfigured incoming call reminder manner is vibration and/or ringing, where the fourth information is used to indicate the second device to display an incoming call notification and not perform vibration and/or ringing reminding, and the second condition includes: detecting a user facial feature, receiving a user operation, or being in a screen on state; and the first device performs reminding through vibration and/or ringing in response to the second incoming call request when the preconfigured incoming call reminder manner is the vibration and/or ringing.

In some embodiments, the method further includes: the first device receives the third incoming call request; and sends fifth information to a fifth device in the one or more second devices when the first device meets a second condition and a preconfigured incoming call reminder manner is a mute notification, where the fifth information is used to indicate the fifth device to perform incoming call reminding, an incoming call reminder manner preconfigured in the fifth device is ringing and/or vibration on ring, and the second condition includes: detecting a user facial feature, receiving a user operation, or being in a screen on state.

In some embodiments, when there are a plurality of fifth devices, the sending fifth information to a fifth device in the one or more second devices includes: the first device sends the fifth information to a sixth device with a highest priority in the plurality of fifth devices.

In some embodiments, the method further includes: the first device receives a fourth incoming call request; and sends first information to a seventh device in the one or more second devices when the first device meets the first condition and the seventh device meets a second condition, where the first information is used to indicate the seventh device to perform incoming call reminding, and the second condition includes: detecting a user facial feature, receiving a user operation, or being in a screen on state.

In some embodiments, the method further includes: the first device receives first response information sent by the seventh device, where the first response information is used to indicate that the seventh device refuses to perform incoming call reminding for the fourth incoming call request; and the first device sends second information to the third device, where the second information is used to indicate the third device to perform incoming call reminding for the fourth incoming call request.

According to a third aspect, an embodiment of this application provides an electronic device. The electronic device includes one or more processors and a memory, the memory is coupled to the processor, the memory is configured to store computer program code, the computer program code includes computer instructions, and when the one or more processors execute the computer instructions, the one or more processors are configured to: receive the first incoming call request; send third information to a third device in the one or more second devices when all of the first device and the one or more second devices meet a first condition, where the third information is used to indicate the third device to perform incoming call reminding for the first incoming call request, the third device is a wearable device, the third device is in a worn state, and the first condition includes a screen off state; and send fourth information to a fourth device, where the fourth information is used to indicate the fourth device to display an incoming call notification, the fourth device is a device other than the third device in the one or more second devices, and an incoming call reminder manner preconfigured in the fourth device is vibration and/or ringing. In some embodiments, the one or more processors are configured to: receive the second incoming call request, and send fourth information to the second device when the electronic device meets a second condition and a preconfigured incoming call reminder manner is vibration and/or ringing, where the fourth information is used to indicate the second device to display an incoming call notification, and the second condition includes: detecting a user facial feature, receiving a user operation, or being in a screen on state; and perform reminding through vibration and/or ringing in response to the second incoming call request when the preconfigured incoming call reminder manner is the vibration and/or ringing.

In some embodiments, the one or more processors are configured to: receive the third incoming call request; and send fifth information to a fifth device in the one or more second devices when the electronic device meets a second condition and a preconfigured incoming call reminder manner is a mute notification, where the fifth information is used to indicate the fifth device to perform incoming call reminding, an incoming call reminder manner preconfigured in the fifth device is ringing and/or vibration on ring, and the second condition includes: detecting a user facial feature, receiving a user operation, or being in a screen on state.

In some embodiments, when there are a plurality of fifth devices, the one or more processors are configured to send the fifth information to a sixth device with a highest priority in the plurality of fifth devices.

In some embodiments, the one or more processors are configured to: receive a fourth incoming call request; and send first information to a seventh device in the one or more second devices when the electronic device meets the first condition and the seventh device meets a second condition, where the first information is used to indicate the seventh device to perform incoming call reminding, and the second condition includes: detecting a user facial feature, receiving a user operation, or being in a screen on state.

In some embodiments, the one or more processors are configured to: receive first response information sent by the seventh device, where the first response information is used to indicate that the seventh device refuses to perform incoming call reminding for the fourth incoming call request; and send second information to the third device, where the second information is used to indicate the third device to perform incoming call reminding for the fourth incoming call request.

According to a fourth aspect, an embodiment of this application provides a computer storage medium, including computer instructions. When the computer instructions are run on an electronic device, the electronic device is enabled to perform the method in the second aspect and the possible embodiments of the second aspect.

According to a fifth aspect, this application provides a computer program product. When the computer program product is run on the foregoing electronic device, the electronic device is enabled to perform the method in the second aspect and the possible embodiments of the second aspect.

It may be understood that the electronic device, the computer-readable storage medium, and the computer program product provided in the foregoing aspects are all applied to the corresponding method provided above. Therefore, for beneficial effects that can be achieved by the electronic device, the computer-readable storage medium, and the computer program product, refer to beneficial effects in the corresponding method provided above. Details are not described herein again.

DESCRIPTION OF EMBODIMENTS

Figure 1:
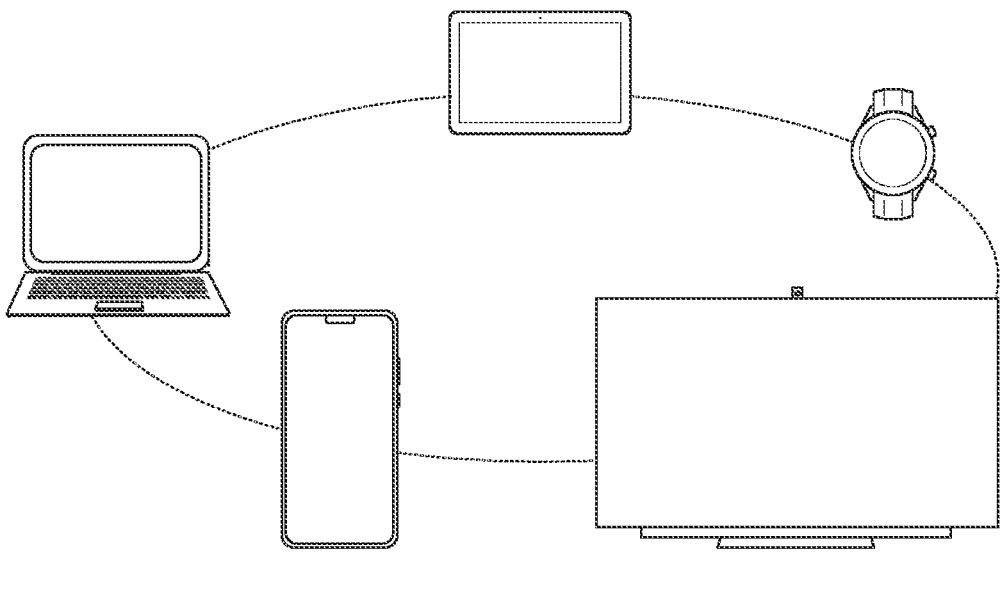
FIG. 1 is a schematic diagram of a structure of a collaborative system according to an embodiment of this application.

Embodiments of this application provide an incoming call reminder method, applied to a collaborative system shown in FIG. 1, which is also referred to as an incoming call reminder system. The collaborative system includes a device 1 (for example, referred to as a first device) and at least one device 2 (for example, referred to as a second device). The device 1 and the device 2 may perform near field communication with each other, and collaborate to implement a plurality of types of services such as a call service, a screen projection service, and a remote control service, based on near field communication.

For example, the device 1 may be an initiating end of collaboration. For example, the device 1 may be an intelligent electronic device such as a mobile phone, a tablet computer, a handheld computer, a PC, a cellular phone, a personal digital assistant (personal digital assistant, PDA), a wearable device (for example, a smartwatch), a smart large screen, a game console, or an augmented reality (augmented reality, AR)\virtual reality (virtual reality, VR) device.

For example, the device 2 may be a collaborative end of collaboration. For example, the device 2 may be an intelligent electronic device such as a mobile phone, a tablet computer, a handheld computer, a PC, a cellular phone, a personal digital assistant (personal digital assistant. PDA), a wearable device (for example, a smartwatch), a smart large screen, a game console, or an augmented reality (augmented reality, AR)\virtual reality (virtual reality, VR) device.

For example, as shown in FIG. 1, the collaborative system may include a mobile phone, a smart large screen, a smartwatch, a tablet computer, a PC, and the like. When any one of the foregoing devices is the device 1, the other devices are devices 2. For example, when the mobile phone is the device 1, the smart large screen, the smartwatch, the tablet computer, and the PC are devices 2.

In some embodiments, in addition to establishing a near field communication connection, there is a trust relationship between the device 1 and the device 2.

For example, when system authentication accounts to which the device 1 and the device 2 log in are a same system authentication account, it may be determined that there is a trust relationship between the device 1 and the device 2. For another example, when a mutual authentication operation (for example, an authorization operation) is performed between the device 1 and the device 2, it may also be determined that there is a trust relationship between the device 1 and the device 2.

For example, if a near field communication connection is established between the mobile phone and a notebook computer, and both the mobile phone and the notebook computer log in to a same system authentication account, for example, an Honor system account, it may be determined that there is a trust relationship between the mobile phone and the notebook computer, in other words, the mobile phone and the notebook computer belong to a same collaborative system.

In some embodiments, devices in the collaborative system may vary. A collaborative system including a mobile phone is used as an example, and the collaborative system further includes a notebook computer. When there is no condition for establishing near field communication between the mobile phone and the notebook computer, for example, a distance between the mobile phone and the notebook computer exceeds a valid communication distance of near field communication, the collaborative system does not include the notebook computer. For another example, in a scenario in which a tablet computer and the mobile phone also log in to a same system authentication account, when there is a condition for establishing a near field communication connection between the tablet computer and the mobile phone, for example, a distance between the tablet computer and the mobile phone does not exceed the valid communication distance of near field communication, the tablet computer may be added to the collaborative system.

As depicted above, when the collaborative system includes the device 1 and at least one device 2, the device 1 and the device 2 may collaborate to implement the call service. In this scenario, the device 1 may be the mobile phone, and the mobile phone has a system-level call application. Certainly, the device 1 may alternatively be an electronic device in which a third-party call application is installed.

For example, when another person makes a call, the device 1 may receive incoming call request information, referred to as an incoming call. It may be understood that the call may be a call service provided by an operator, or may be a call service provided by communication software (for example, MeeTime™ or WeChat™). In addition, the call may include a voice call and a video call. The voice call may be a call transmitting only voice data. The video call may be a call synchronously transmitting voice data and real-time image data.

When the device 1 receives an incoming call, the device 1 and the device 2 may successively or synchronously enable incoming call reminding, for example, enable ringing and vibration, and display a reminder interface. In this way, a user can choose to answer the incoming call by using the device 1 or the device 2.

Obviously, when there are a relatively large quantity of devices 2 in the collaborative system, in a process in which the device 1 and the device 2 successively or synchronously enable incoming call reminding, the user can be effectively prevented from missing the incoming call. However, when all devices indistinguishably perform incoming call reminding, some trouble is brought to the user. For example, the user needs to determine whether reminding performed by the device 2 and the device 1 is for a same incoming call. For another example, after the user answers the call by using either device (the device 1 or the device 2), another device in the collaborative system does not immediately stop reminding, in other words, the another device still performs incoming call reminding and the like within a delay period. Due to the foregoing trouble, the user needs to view and operate the device 1 and the plurality of devices 2 for a plurality of times. Obviously, in a scenario of communication service collaboration, human-computer interaction efficiency of processing an incoming call reminder is relatively low.

To alleviate the foregoing problem, an embodiment of this application provides an incoming call reminder method, applied to the foregoing collaborative system. The collaborative system includes a device 1 and a plurality of devices 2. In the method, a device 3 is determined from the plurality of devices 2 based on actual usage statuses of the device 1 and the devices 2 and with reference to a preset device selection policy, and the device 1 and the device 3 are controlled to collaborate to perform incoming call reminding. In this way, when there are at least three devices in the collaborative system, a problem that all devices in the collaborative system indistinguishably perform incoming call reminding is alleviated, and human-computer interaction efficiency of processing an incoming call reminder in the collaborative system is improved.

In some other embodiments, in the method, alternatively, a device 3 may be determined from the device 1 and the plurality of devices 2 based on actual usage statuses of the device 1 and the devices 2 and with reference to a preset device selection policy, and the device 3 may be controlled to perform incoming call reminding.

In some embodiments, software and hardware structures of the devices in the foregoing collaborative system may be different.

Figure 2A:
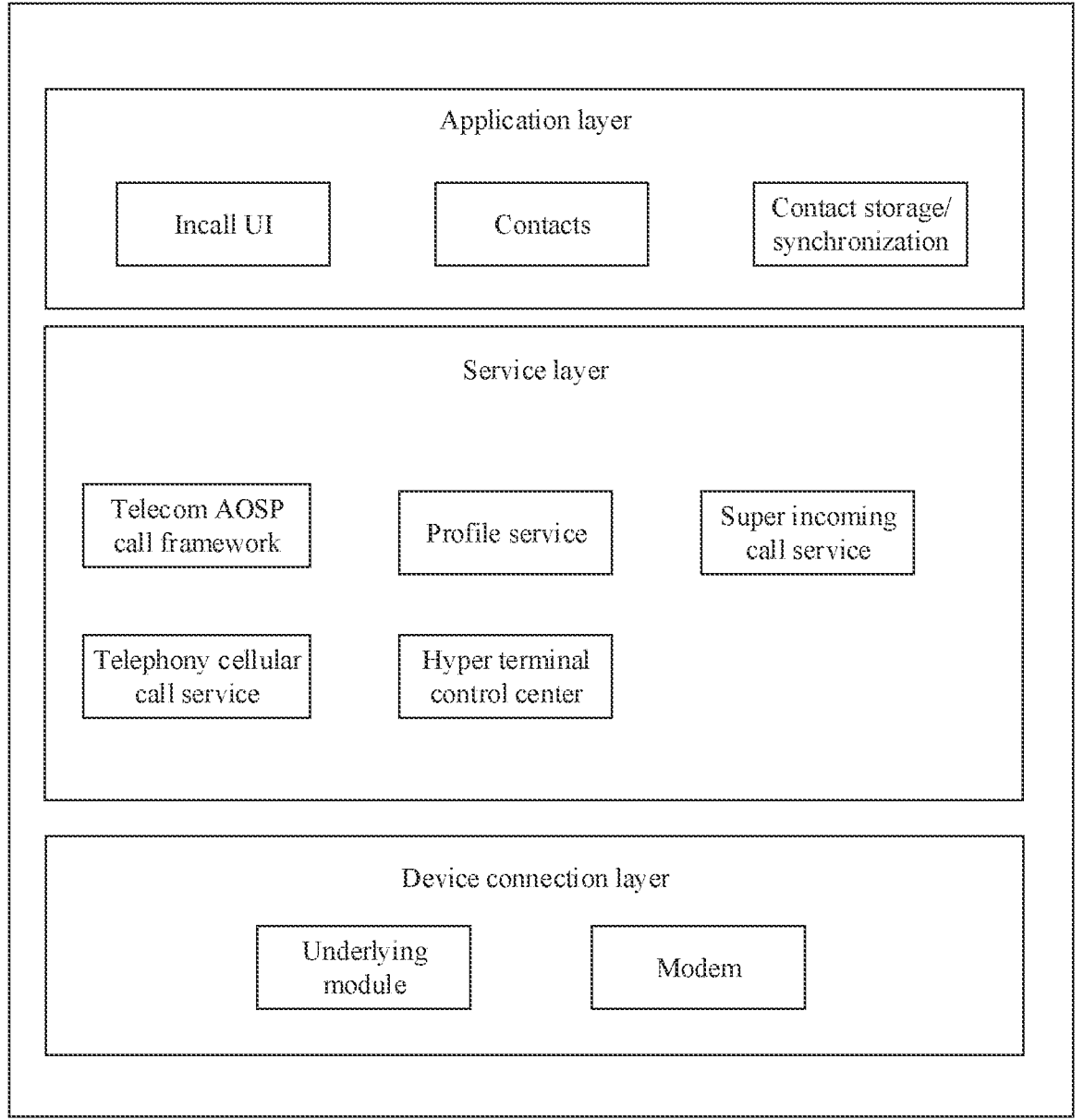
FIG. 2A is a first example diagram of software and hardware structures of an electronic device according to an embodiment of this application.

A mobile phone is used as an example. As shown in FIG. 2A, the mobile phone may include an application layer, a service layer, and a device connection layer.

The application layer may include a series of application packages. As shown in FIG. 2A, the application layer may include a plurality of application packages such as an incall user interface (incall User Interface, incall UI) program, a contacts application, and a contact storage/synchronization application.

The service layer provides an application programming interface (application programming interface, API) and a programming framework for an application at the application layer. The service layer includes some predefined functions.

As shown in FIG. 2A, the programming framework may include a Telecom AOSP call framework. The Telecom AOSP call framework may be configured to manage audio and video calls of the mobile phone, including a SIM-based call (for example, using a Telephony framework) and a VOIP call provided by a ConnectionService API implementer.

In addition, an API may further include an API configured to invoke a Telephony cellular call service, an API configured to invoke a Profile service, an API invoking a super incoming call service, and an API invoking a hyper terminal control center. In this way, an installed application may invoke a corresponding API or programming framework from the service layer based on an actual business requirement, to implement a service required by a business.

In addition, the device connection layer includes a device virtualization layer, a hardware abstraction layer (hardware abstraction layer, HAL), and a hardware layer.

For example, the hardware layer includes a plurality of types of hardware modules, and different hardware modules may implement different functions. For example, the hardware layer includes a modem and a Link module. The modem is configured to implement translation of signals between different devices, and the Link module is configured to implement a communication connection function between devices, and the like.

For another example, the HAL provides HALs, for example, an Audio HAL, a Camera HAL, and a Wi-Fi HAL, corresponding to different hardware modules. In this way, each HAL can drive a corresponding hardware module to implement a function corresponding to the hardware module.

In addition, the device virtualization layer may virtualize, based on the hardware module, a module implementing a specific function. For example, the device virtualization layer may include an audio virtualization module.

In this embodiment of this application, the HAL and the corresponding hardware module may be referred to as an underlying module. Similarly, the module virtualized by the device virtualization layer may also be referred to as an underlying module. It can be learned that the device connection layer includes underlying modules implementing a plurality of functions. In this way, the device connection layer also has various capabilities such as a device Profile, a device networking discovery capability, partial authority management, security, and transmission.

It may be understood that the service layer may invoke one or more underlying modules at the device connection layer to indicate the device connection layer to enable different functions, for example, implement a call function. For ease of description, an underlying module configured to implement the call function may be referred to as an underlying call module.

Figure 2B:
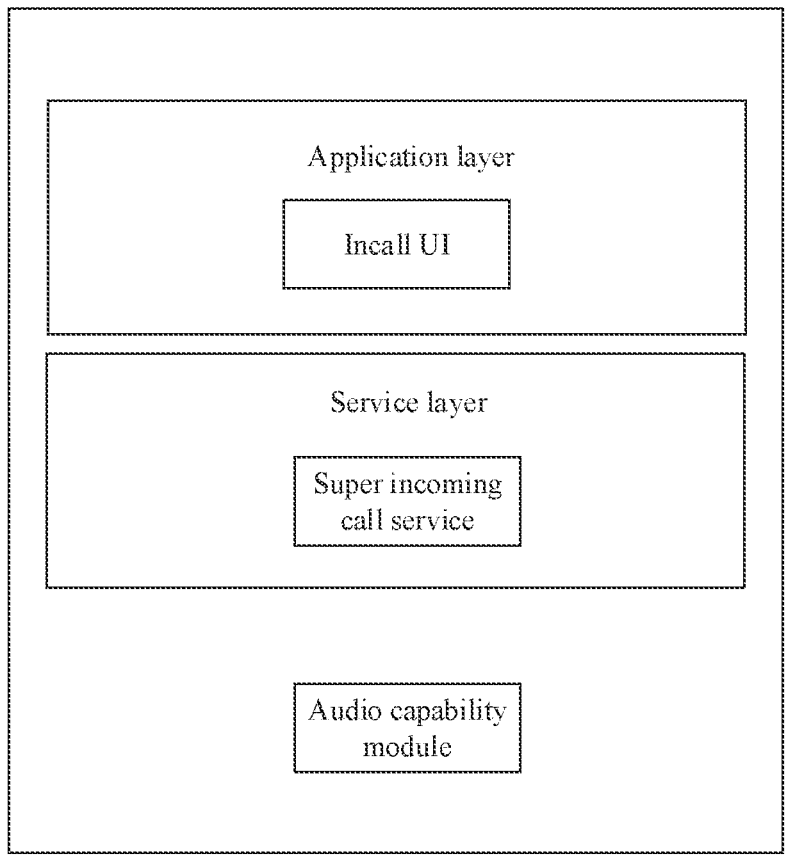
FIG. 2B is a second example diagram of software and hardware structures of an electronic device according to an embodiment of this application.

A watch is then used as an example. As shown in FIG. 2B, the watch may also include an application layer, a service layer, and a device connection layer. Similarly, the application layer of the watch also includes an incall UI. In addition, the service layer may include an API invoking a super incoming call service. In addition, the device connection layer of the watch includes no underlying call module, but includes an audio capability module. When a communication connection is established between the watch and the mobile phone, the mobile phone may share the call function with the watch. For example, the watch may decode call data 1 by using the underlying call module of the mobile phone to obtain audio information 1. Then the watch plays the audio information 1 by using the audio capability module, so that the watch can implement a call answering function. In addition, the watch may further collect audio information 2 by using the audio capability module, and then encode the audio information 2 by using the underlying call module of the mobile phone to obtain and send call data 2. In this way, the watch can implement an intercom function.

Figure 2C:
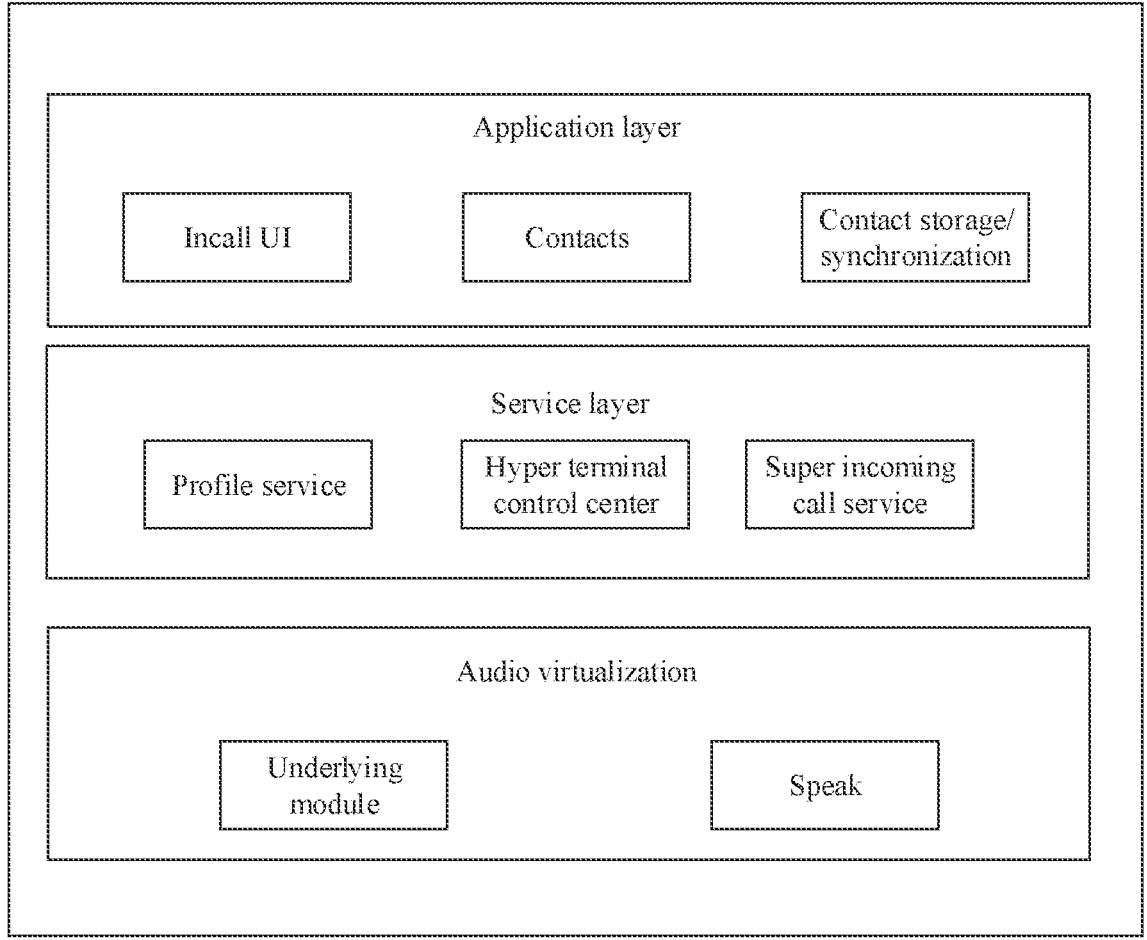
FIG. 2C is a third example diagram of software and hardware structures of an electronic device according to an embodiment of this application.

A PC is further used as an example. As shown in FIG. 2C, the PC may also include an application layer, a service layer, and a device connection layer. The application layer may also include a plurality of application packages such as an incall UI, a contacts application, and a contact storage/synchronization application. The service layer of the PC includes an API configured to invoke a Profile service, an API invoking a super incoming call service, and an API invoking a hyper terminal control center. In addition, when the device connection layer of the PC includes no underlying call module, and does not include an underlying module (for example, an audio virtual module) implementing an audio capability, a software module for a virtual audio function, for example, referred to as an audio analog module, may be created. When a communication connection is established between the PC and the mobile phone, the mobile phone may share the call function with the PC. For example, the PC may decode received call data 1 by using the underlying call module of the mobile phone to obtain audio information 1. Then the PC plays the audio information 1 by using the audio analog module, so that the PC can implement a call answering function. In addition, the PC may further collect audio information 2 by using the audio analog module, and then encode the collected audio information 2 by using the underlying call module of the mobile phone to obtain and send call data 2. In this way, the PC can implement an intercom function.

It can be learned that, even if there are different software and hardware structures, all the devices in the collaborative system support incoming call answering, and the devices can also collaborate to perform incoming call reminding. The mobile phone and the PC are used as examples to describe a principle of collaborating on incoming call reminding by devices in the collaborative system.

Figure 3A:
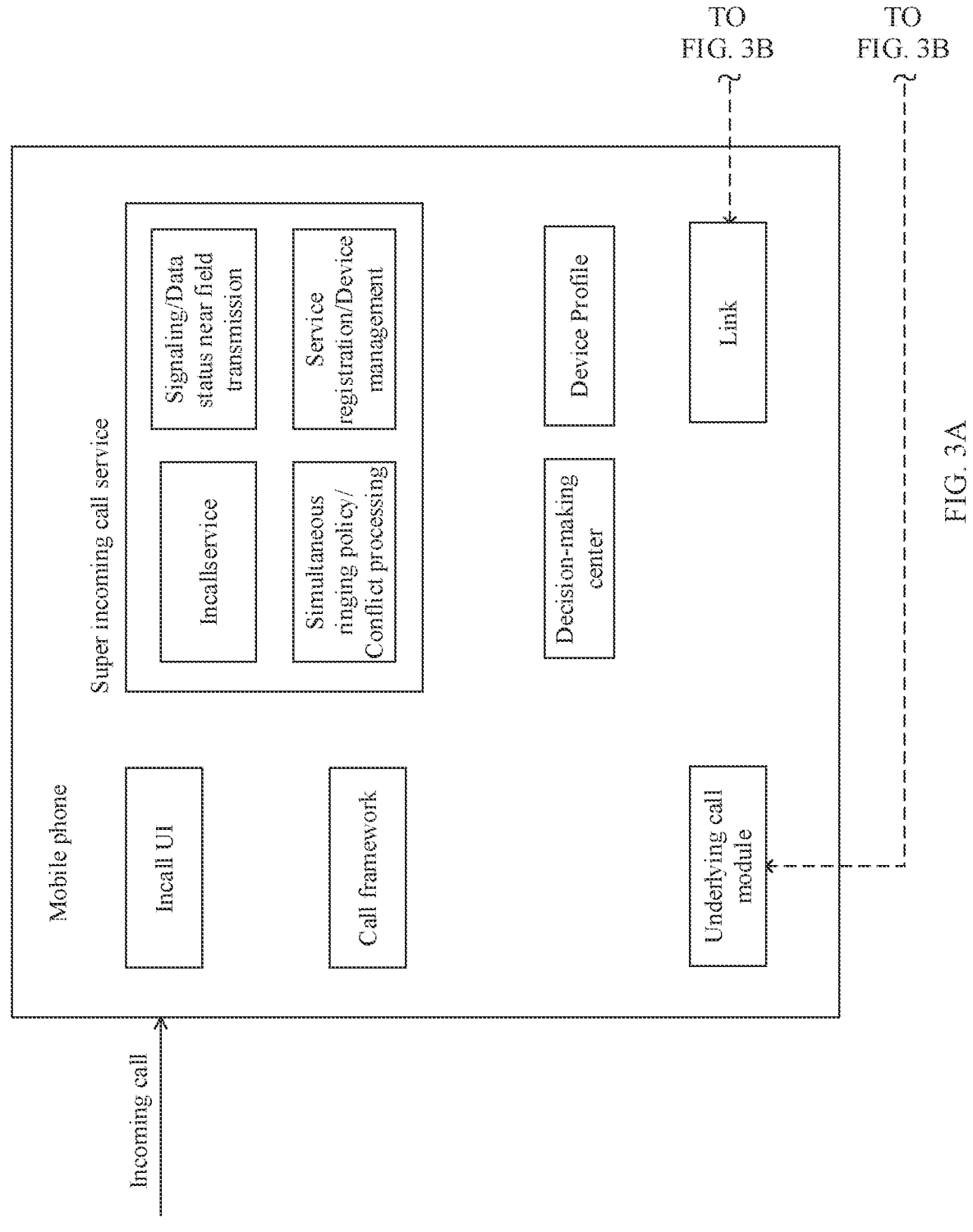
FIG. 3A and FIG. 3B are an example diagram of modules of a mobile phone and a PC according to an embodiment of this application.
Figure 3B:
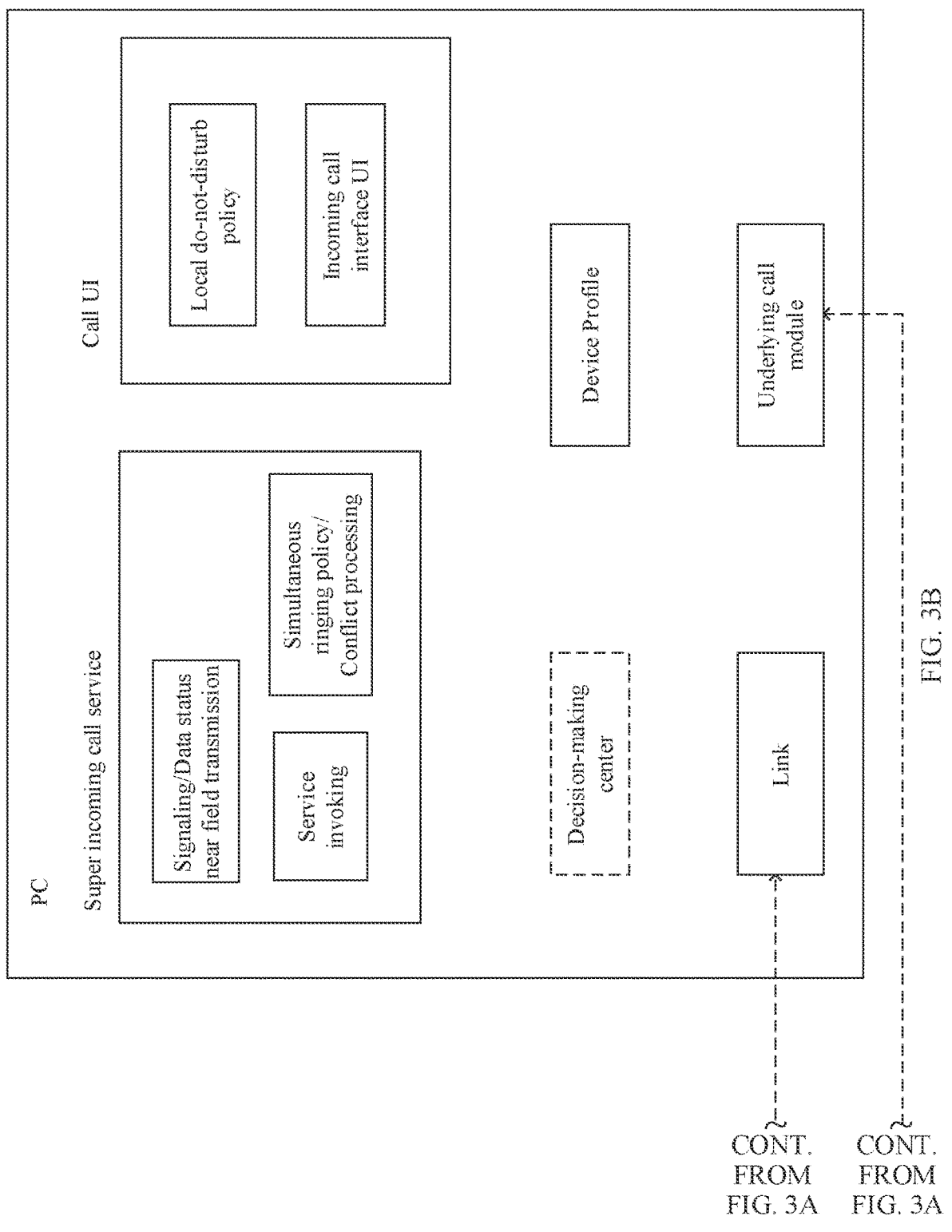

In some embodiments, as shown in FIG. 3A and FIG. 3B, the mobile phone includes a super incoming call service, a decision-making center, a Device Profile, and a Link module.

The mobile phone may establish a communication connection to the PC by using the link module, to receive data sent by the PC, for example, static service information sent by the PC.

In some examples, the static service information includes profile information, a usage status, near field information, and the like. The Profile information may include a profile type supported by the PC. For example, a phonebook access profile (phonebook access profile, PBAP) type, a hands-free profile (hands-free profile, HFP) type, and an object push profile (Object Push Profile, OPP) type are supported. The Profile information may further include profile version information supported by the PC and the like. The near field information includes an available near field communication type, a parameter used to establish a near field communication link, and the like.

It may be understood that the mobile phone may establish a service link with the PC based on the profile information and the near field information of the PC. The service link is used to transmit interaction data in a service collaboration process.

In addition, the usage status may be used to indicate a current working status of the PC. The current working status of the PC may be evaluated from aspects, for example, whether there is an application running in a foreground and whether there is interaction with a user. For example, the usage status includes an in-use state and a not-in-use state. When there is an application running in the foreground of the PC, it is evaluated that the PC is in the in-use state. When there is interaction between the PC and the user, it is evaluated that the PC is in the in-use state. For example, a camera of the PC identifies that the user faces a display screen of the PC. For another example, when an input device of the PC receives a user operation or the like, it may be determined that there is interaction between the PC and the user, and it is evaluated that the PC is in the in-use state. For still another example, when the display screen of the PC is turned on, it may also be determined that there is interaction between the PC and the user, and it is evaluated that the PC is in the in-use state. When there is no application running in the foreground of the PC and the PC identifies no interaction with the user, it is evaluated that the PC is in the not-in-use state. In an implementation, the PC may evaluate the usage status of the PC by using an artificial intelligence model and with reference to real-time running data of the PC.

In some other embodiments, when a first device (or a second device) meets a first condition, it may be determined that the first device (or the second device) is in the not-in-use state. For example, the first condition may be that the first device (or the second device) is in a screen of state. For another example, the first condition may be that the first device (or the second device) includes no application running in a foreground. For another example, the first condition may be that no user operation is received in a long time (preset duration).

In some other embodiments, when the first device (or the second device) meets a second condition, it may be determined that the first device (or the second device) is in the in-use state. The second condition includes: detecting a user facial feature, receiving a user operation, being in a screen on state, or the like.

In another possible embodiment, the static service information may further include a collaborative status. The collaborative status is used to indicate whether the PC is currently executing a collaborative task. The collaborative task may include a multi-screen collaborative task, a screen projection task, a remote control task, and a call collaborative task. The foregoing tasks may be collectively referred to as a first task. For example, when the PC and a tablet computer are performing multi-screen collaboration, the collaborative status of the PC may indicate that the PC is executing a collaborative task. For another example, when the PC projects an interface onto an intelligent television, the collaborative status of the PC may also indicate that the PC is executing a collaborative task. For another example, when the tablet computer remotely controls the PC, the collaborative status of the PC may also indicate that the PC is executing a collaborative task. For another example, when a subscriber identity module (subscriber identity module, SIM) card is configured in the tablet computer, and the PC is answering an incoming call 2 received by the tablet computer, the collaborative status of the PC may also indicate that the PC is executing a collaborative task.

In addition, a mapping table, referred to as a device list, for example, is configured in the mobile phone. The device list may be used to maintain received static service information.

In some embodiments, when the mobile phone receives static service information 1 sent by the PC, the mapping table includes an entry 1, and the entry 1 includes an identifier indicating the PC and the corresponding static service information 1.

In addition, the PC may periodically send static service information to the mobile phone, to ensure that the PC can update a real-time usage status or real-time profile information to the mobile phone. In this way, an entry in the mapping table can be updated in real time. For example, the mobile phone receives static service information 2 newly sent by the PC, and the mobile phone may update the entry 1. An updated entry 1 includes the identifier indicating the PC and the corresponding static service information 2.

Certainly, when there is no condition for near field communication between the PC and the mobile phone, for example, an actual distance between the PC and the mobile phone exceeds a valid communication distance, the mobile phone cannot receive the static service information sent by the PC, and the entry corresponding to the PC cannot be updated, either.

In addition, the entry also has time validity. During a valid period, the entry is in a valid state. If the entry is updated within the valid period, the valid period is reset. Certainly, the entry is invalid if the valid period expires and the entry is not updated. For example, if the valid period is 1 minute, after receiving the static service information 1 sent by the PC, the mobile phone creates the entry 1, and the entry 1 includes the identifier indicating the PC and the static service information 1. The entry 1 is valid within 1 minute after the entry 1 is created. Within 1 minute after the entry 1 is created, if the mobile phone receives the static service information 2 sent by the PC, the entry 1 is updated, and the updated entry 1 includes the identifier indicating the PC and the static service information 2. In addition, the entry 1 is still valid within 1 minute after the entry 1 is updated. If the entry 1 is not updated again in more than 1 minute after the entry 1 is updated, the entry 1 is invalid.

Certainly, the mobile phone may further receive static service information sent by another device (for example, a smart large screen, a smartwatch, or the tablet computer) in the collaborative system, and update the device list.

In some embodiments, the service layer of the mobile phone may read the device list by using the Device Profile. It may be understood that the Device Profile is a service query interface, and is configured to query a service that can be supported by another device.

In this way, the mobile phone can determine, by invoking the Device Profile, another device, for example, the PC, the smart large screen, the smartwatch, or the tablet computer, belonging to a same collaborative system as the mobile phone.

For example, after the mobile phone receives an incoming call, the super incoming call service may obtain a valid entry in the device list by using the Device Profile, to obtain another device (for example, referred to as a device 2) in the same collaborative system and static service information corresponding to the device 2.

In some embodiments, the decision-making center of the mobile phone may be configured to indicate, based on the static service information of the device 2, the Link module to establish connections to all devices 2, for example, establish service links, and transfer, through the service links, negotiation information existing before collaboration is performed on the call service.

In addition, the decision-making center of the mobile phone is further configured to determine a device 3 from the collaborative system.

In some embodiments, the device 3 determined by the decision-making center meets at least one of the following conditions:

First, the device can remind the user in a timely manner to answer an incoming call. In some embodiments, the decision-making center may evaluate, in the collaborative system based on a usage status of the device, a device that can remind the user in a timely manner to answer the incoming call.

Second, the device has a relatively high priority. A device type priority is configured in the mobile phone. For example, for device type priorities, a priority of the smartwatch may be greater than that of the tablet computer, the priority of the tablet computer may be the same as that of the PC, and the priority of the PC may be greater than that of the smart large screen. In addition, the device type priority may also be updated. For example, the mobile phone may modify the device type priority in response to a user operation.

Third, there is no collaborative conflict with the mobile phone.

For example, when the mobile phone disables a collaborative service, it may be determined that there is a collaborative conflict with all the devices. For another example, when a prohibited list of the mobile phone includes the PC, it may also be determined that there is a collaborative conflict between the PC and the mobile phone. A device in the prohibited list may be configured by the user. In this way, in a process of determining the device 3 from the devices 2, the decision-making center can first screen out a device in the devices 2 that has a collaborative conflict with the mobile phone, and then determine the device 3 from devices 2 obtained after the screening.

For example, when the mobile phone identifies that the mobile phone is in the in-use state, and receives an incoming call, the decision-making center may obtain a plurality of devices 2, for example, the PC, the smart large screen, the smartwatch, and the tablet computer in the same collaborative system as the mobile phone, from the device list. Then the decision-making center determines, from the devices 2 based on the device type priority (for example, the priority of the smartwatch is greater than that of the tablet computer, the priority of the tablet computer is the same as that of the PC, and the priority of the PC is greater than that of the smart large screen), that the priority of the smartwatch is the highest. In this way, the decision-making center can determine the smartwatch as the device 3.

In a possible embodiment, the static service information of the device 2 further includes an identifier indicating an event reminder mode of the device 2, for example, an identifier indicating whether to enable a vibration on ring mode. It may be understood that, when the vibration on ring mode is enabled, the device 2 is in a vibration on ring state. To be specific, the device 2 performs event reminding, for example, incoming call reminding, message reminding, calendar reminding, and task reminding, through vibration, ringing, vibration on ring, or the like. Certainly, the user may select a reminder manner actually used in the vibration on ring mode from vibration, ringing, or vibration on ring. For example, if the user configures a reminder manner corresponding to the vibration on ring mode as vibration, when the vibration on ring mode is enabled, reminding is performed through vibration when there is a to-be-reminded event. For another example, if the user configures a reminder manner corresponding to the vibration on ring mode as ringing, when the vibration on ring mode is enabled, reminding is performed through ringing when there is a to-be-reminded event.

In addition, a non-vibration on ring mode (also referred to as a mute mode) and the vibration on ring mode are mutually exclusive event reminder modes. When the mute mode is enabled on the device 2, the device 2 is in a mute state. To be specific, the device 2 performs event reminding through a mute notification, for example, displays a reminder notification, but does not ring or vibrate.

Based on this, the decision-making center may determine the device 3 with reference to the event reminder mode of the device 2 in addition to the device type priority. For example, the decision-making center may select a device with a highest priority as the device 3 from devices 2 enabling the vibration on ring mode. For example, in the devices 2, the vibration on ring mode is enabled on the PC and the smart large screen, and the vibration on ring mode is enabled on neither the smartwatch nor the tablet computer, in other words, the mute mode is enabled on the smartwatch and the tablet computer. Based on the device type priority, the device 3 may be selected from the PC and the smart large screen, in other words, the PC is selected as the device 3.

In another possible embodiment, the static service information of the device 2 further includes an identity. The identity may be used to indicate a user of the device 2, and the user is a user who currently uses the device 2.

For example, the device 2 stores a correspondence between a plurality of pieces of biometric feature information (for example, a facial feature, a fingerprint feature, and an iris feature) and an identity. After receiving a user operation, the device 2 determines that a usage status of the device 2 is the in-use state, and may further synchronously collect a biological feature. When the biological feature is collected, the collected biological feature is compared with that in the preset correspondence, to determine a corresponding identity.

In this way, in some embodiments, the decision-making center further needs to determine the device 3 from the devices 2 with reference to the identity in the static service information. For example, the decision-making center may determine a device 4 from the devices 2. An identity carried in static service information of the device 4 matches a system authentication account (for example, a system authentication account 1) to which the mobile phone logs in. For example, the identity corresponding to the device 4 is the same as an identity bound to the system authentication account 1. Then the decision-making center determines the device 3 from devices 4 with reference to usage statuses and device type priorities of the devices 4.

For another example, when the smartwatch is in the in-use state, after the mobile phone receives an incoming call, the mobile phone may determine the smartwatch as the device 3. In this way, the mobile phone and the smartwatch can collaborate to perform incoming call reminding.

Certainly, this also applies to a scenario in which the tablet computer, the PC, and the smart large screen are in the in-use state, and details are not described herein again. When all the devices in the collaborative system are in the not-in-use state, if it is identified that the user wears the smartwatch, the smartwatch may be determined as the device 3.

In another embodiment, when at least one device in the collaborative system is in the in-use state and it is identified that the user wears the smartwatch, in addition to determining the device in the in-use state as the device 3, the smartwatch may be further determined as the device 3.

In another possible embodiment, the devices 2 further include a device 5, and the device 5 is a device other than the device 3 in the devices 2. When the mobile phone indicates the device 3 to collaborate on incoming call reminding, the mobile phone may also send a notification instruction to the device 5. The device 5 may display, according to the notification instruction, notification information indicating an incoming call, in other words, the device 5 performs only display reminding, and does not need to perform sound reminding or vibration reminding. It may be understood that, even if a vibration mode is enabled on the device 5 and a configured reminder manner is ringing or vibration, the device 5 does not need to perform ringing or vibration when collaborating with the mobile phone to perform incoming call reminding.

In some other embodiments, after receiving an incoming call, the mobile phone may determine the device 3 from the collaborative system based on only the priority. For example, the collaborative system to which the mobile phone belongs further includes the PC, the smart large screen, the smartwatch, and the tablet computer, and the priority of the smartwatch in the collaborative system is the highest. In this case, the mobile phone may determine the smartwatch as the device 3, and collaborate with the device 3 to perform incoming call reminding.

After determining the device 3, the decision-making center is further configured to send simultaneous ringing information to the super incoming call service, and the simultaneous ringing information includes an identifier indicating the device 3, for example, the identifier of the PC. After receiving the simultaneous ringing information, the super incoming call service may indicate the Link module to send a simultaneous ringing instruction to the PC. The simultaneous ringing instruction is request information for indicating the PC to collaborate with the mobile phone to perform incoming call reminding.

In some other embodiments, when a plurality of devices 3 are determined, the decision-making center may successively send simultaneous ringing instructions to the devices 3 based on a priority sequence of the plurality of devices 3.

In an implementation, the super incoming call service further includes Incallservice, a simultaneous ringing policy/conflict processing module, a signaling/data status near field transmission module, and a service registration/device management module.

The service registration/device management module is configured to write the received static service information into the device list by using the Device Profile. In addition, the service registration/device management module is further configured to invoke the Device Profile to query the device list, to obtain the static service information corresponding to the device 2.

The simultaneous ringing policy/conflict processing module is configured to indicate the decision-making center to determine the device 3, and is further configured to receive the simultaneous ringing information sent by the decision-making center. The simultaneous ringing information includes the identifier of the device 3.

The Incallservice is a service interface for non-native InCallUI to invoke a call reservation framework in the mobile phone. To be specific, another device may operate an incoming call of the mobile phone (for example, answer the incoming call of the mobile phone or hang up the incoming call of the mobile phone) by using the Incallservice, and perceive a call status change of the mobile phone.

For example, the Incallservice is configured to generate a simultaneous ringing instruction based on the simultaneous ringing information. Each simultaneous ringing instruction corresponds to one device 3. Finally, the signaling/data status near field transmission module indicates the link module to send the simultaneous ringing instruction to the device 3.

An example in which the PC receives a simultaneous ringing instruction from the mobile phone is still used. A super incoming call service of the PC includes a signaling/data status near field transmission module, a simultaneous ringing policy/conflict processing module, and a service invoking module.

The signaling/data status near field transmission module is configured to receive the simultaneous ringing instruction by using the Link module. The signaling/data status near field transmission module is further configured to indicate the simultaneous ringing policy/conflict processing module to start a call UI. The call UI is configured to pulls up an interface UI for displaying an incoming call reminder, referred to as an incoming call interface UI.

In some embodiments, before the call UI pulls up the incoming call interface UI, the simultaneous ringing policy/conflict processing module is further configured to indicate to determine whether the PC currently has a condition for collaborating on incoming call reminding.

It may be understood that a plurality of scenario conditions 1 may be preconfigured in the PC, and the scenario condition 1 may indicate a scenario in which the PC cannot collaborate on the call service.

For example, the scenario condition 1 includes that an application 1 is enabled by the PC. The application 1 is an application preconfigured to be undisturbed by the call service, and is also referred to as a first application. First applications disposed in different devices may be different, and this is not specifically limited. It may be understood that after the PC selects an application as the application 1 in response to a user operation, the PC may adjust a priority of an application service corresponding to the application to be greater than that of the call service. For example, if the user configures a video conference application as the application 1, the PC raises a priority of a conference service corresponding to the video conference application to be greater than that of the call service. In this way, when the PC runs the video conference application, in other words, provides the conference service, the PC does not collaborate on a call type service. In other words, the scenario condition 1 includes that the PC runs the video conference application.

For another example, the scenario condition 1 includes that the PC does not enable collaborative permission of the call service, for example, the PC disables a collaborative function of the call service. In this way, call collaboration requests sent by all devices can be rejected.

For still another example, the scenario condition 1 further includes that the PC is executing a collaborative task. For example, the PC is performing multi-screen collaboration with the tablet computer. For another example, the PC is projecting a screen onto the intelligent TV. For another example, the tablet computer is remotely controlling the PC.

In this way, when detecting that the application 1 is running in a foreground or the collaborative permission of the call service is not enabled, or detecting that the PC is in a collaborating state or the PC is in a screen projection state, the simultaneous ringing policy/conflict processing module of the PC determines that the PC currently does not meet the condition for collaborating on incoming call reminding. On the contrary, it is determined that the PC currently meets the condition for collaborating on incoming call reminding.

In some embodiments, if the PC includes a decision-making center, the simultaneous ringing policy/conflict processing module may indicate the decision-making center to determine whether the PC currently meets the condition for collaborating on incoming call reminding. In addition, when the decision-making center is not ready, the simultaneous ringing policy/conflict processing module of the PC may also preliminarily evaluate whether the condition for incoming call reminding is met. For example, the simultaneous ringing policy/conflict processing module detects whether the decision-making center registers with a simultaneous ringing service. The simultaneous ringing service may be a service that the PC registers with the decision-making center after receiving an incoming call or collaborating with another device on a call, indicating that the PC is in a call or is collaborating on a call. When the simultaneous ringing service is registered, it may be preliminarily evaluated that the condition for incoming call reminding is not met. When it is determined that the condition for incoming call reminding is not met, the PC may refuse to collaborate with the mobile phone to perform incoming call reminding.

In some other embodiments, the call UI further includes a local do-not-disturb policy module, and the local do-not-disturb policy module may also access the preconfigured scenario condition 1. In this way, when the PC includes no decision-making center, the simultaneous ringing policy/conflict processing module may indicate the local do-not-disturb policy module to determine whether the PC currently meets the condition for collaborating on incoming call reminding.

In addition, the local do-not-disturb policy module is further configured to evaluate, by using a preconfigured device list 1, also referred to as a first list, whether the mobile phone has permission to indicate the PC to execute a call service collaborative task. The device list 1 includes a device identifier, and different device identifiers indicate different electronic devices. In addition, in this way, after it is determined that the condition for collaborating on incoming call reminding is met, it can also be determined, by checking the device list 1, whether the mobile phone has permission to collaborate with the PC on the call service. If the device list 1 includes the identifier of the mobile phone, it is determined that the mobile phone has no permission to collaborate with the PC on the call service Otherwise, if the device list 1 does not include the identifier of the mobile phone, it is determined that the mobile phone has the permission to collaborate with the PC on the call service. Certainly, content of first lists of different devices may be different.

After it is determined that the mobile phone has the permission to collaborate with the PC on the call service, the call UI may pull up the incoming call interface UI and perform incoming call reminding.

For example, after the PC receives the simultaneous ringing instruction sent by the mobile phone, the simultaneous ringing policy/conflict processing module may obtain static service information of the mobile phone from the Device Profile. It may be understood that in a process in which the PC sends the static service information to the mobile phone, the mobile phone also periodically sends the static service information of the mobile phone to the PC. In this way, when the static service information of the mobile phone indicates that the mobile phone is in the in-use state, and the PC determines to collaborate with the mobile phone to perform incoming call reminding, the PC performs incoming call reminding in a mute reminder manner of displaying a notification. When the static service information of the mobile phone indicates that the mobile phone is in the not-in-use state, and the PC determines to collaborate with the mobile phone to perform incoming call reminding, the PC performs incoming call reminding in a configured reminder manner (for example, vibration, ringing, or vibration on ring).

In addition, after the PC pulls up the incoming call interface UI, the user may indicate, by operating the PC, the PC to answer the incoming call.

After the PC receives a user operation indicating to answer the incoming call, the service invoking module may schedule an underlying call module to collaborate with the underlying call module of the mobile phone, to answer the incoming call received by the mobile phone. For example, after the PC receives the user operation indicating to answer the incoming call, the PC notifies the mobile phone. In this way, after receiving a notification, the mobile phone receives call data 1 corresponding to the incoming call, invokes the Telecom AOSP call framework and the Telephony cellular call service, enables the underlying call module of the mobile phone, decodes the call data 1 to obtain audio information 1, and then sends the audio information 1 to the PC. After the PC obtains the audio information 1, the service invoking module in the super incoming call service may invoke the underlying call module of the PC to play the audio information 1. In addition, the PC may further invoke, by using the service invoking module, the underlying call module to collect audio information 2, and send the audio information 2 to the mobile phone. In this way, the mobile phone can encode the audio information 2 by using the underlying call module, to obtain and send call data 2.

Certainly, when the user chooses to operate the mobile phone to answer the incoming call, as shown in FIG. 3A and FIG. 3B, after the mobile phone receives the incoming call, the incall UI may be enabled. After the incall UI is enabled on the mobile phone, the incall UI pulls up an interface for displaying an incoming call. In addition, the underlying call module may be further scheduled by using a call framework, for example, the Telecom AOSP call framework or the Telephony cellular call service, so that it is convenient for the user to answer the incoming call by using the mobile phone.

In summary, after receiving an incoming call request, the mobile phone may determine, based on a usage status, a device status (for example, a configured reminder manner), a priority, and the like of each device (including the mobile phone) in the collaborative system, how another device in the collaborative system performs incoming call reminding.

The following uses an example in which the collaborative system includes the mobile phone, the smart large screen, the smartwatch, the tablet computer, and the PC. In different usage scenarios, responses made by the mobile phone, the smart large screen, the smartwatch, the tablet computer, and the PC to the incoming call request received by the mobile phone are shown in Table 1:

TABLE 1

| Status of using a device by the user | Device usage scenario | Response made by each device to an incoming call request |
|---|---|---|
| The user is using any device in the collaborative system | The mobile phone is used | The mobile phone performs reminding through vibration on ring, and other devices display incoming call notifications (without simultaneous ringing) The mobile phone does not perform reminding through vibration on ring, and another device that has a high priority and on which the vibration on ring mode is enabled performs reminding through vibration on ring |
| | The smartwatch is used | The mobile phone and the smartwatch perform incoming call reminding in reminder manners (for example, vibration, ringing, or vibration on ring) configured in the mobile phone and the smartwatch, and other devices display incoming call notifications (without simultaneous ringing) |
| | The tablet computer is used | The mobile phone and the tablet computer perform incoming call reminding in reminder manners (for example, vibration, ringing, or vibration on ring) configured in the mobile phone and the tablet computer, and other devices display incoming call notifications (without simultaneous ringing) |
| | The PC is used | The mobile phone and the PC perform incoming call reminding in reminder manners (for example, vibration, ringing, or vibration on ring) configured in the mobile phone and the PC, and other devices display incoming call notifications |

TABLE 1-continued

| Status of using a device by the user | Device usage scenario | Response made by each device to an incoming call request |
|---|---|---|
| | | (without simultaneous ringing) |
| | The smart large screen is used | When a super incoming call function is enabled on the smart large screen, the mobile phone and the smart large screen perform incoming call reminding in reminder manners (for example, vibration, ringing, or vibration on ring) configured in the mobile phone and the smart large screen, and other devices display incoming call notifications (without simultaneous ringing) When only a call transfer function is enabled on the smart large screen, the mobile phone perform incoming call reminding in a reminder manner configured in the mobile phone, and the smart large screen only transfers call data but cannot actively answer a call or give feedback through an outgoing call When the super incoming call function is disabled on the smart large screen, the mobile phone perform incoming call reminding in a reminder manner configured in the mobile phone, the smart large screen does not respond, and another device that has a high priority and on which a vibration on ring mode is enabled performs reminding through vibration on ring |
| The user uses no device in the collaborative system | The smartwatch is worn | The mobile phone and the smartwatch perform incoming call reminding in reminder manners (for example, vibration, ringing, or vibration on ring) configured in the mobile phone and the smartwatch, and other devices display incoming call notifications (without simultaneous ringing) |

Table 1 shows some examples of multi-device collaboration on incoming call reminding according to this application. This application is not limited thereto. The smartwatch is only an example of a wearable device. The wearable device in the collaborative system may also be referred to as a third device. For example, the third device may be a Bluetooth headset. In addition, a device other than the third device and the first device in the collaborative system may also be referred to as a fourth device. When all the devices in the collaborative system meet the first condition (namely, a condition of not being used), and the first device receives an incoming call (for example, referred to as a first incoming call request), regardless of whether an incoming call reminder manner preconfigured in the fourth device is ringing, vibration, or vibration on ring, the fourth device does not ring and/or vibrate. For example, the fourth device may not respond at all. For another example, the fourth device may only display an incoming call notification. In addition, the first device may further send a simultaneous ringing instruction (namely, third information) to the third device, to indicate the third device to perform incoming call reminding for the first incoming call request.

The following describes an implementation procedure of a method provided in an embodiment of this application by using an example in which a device 1 is a mobile phone.

Figure 4:
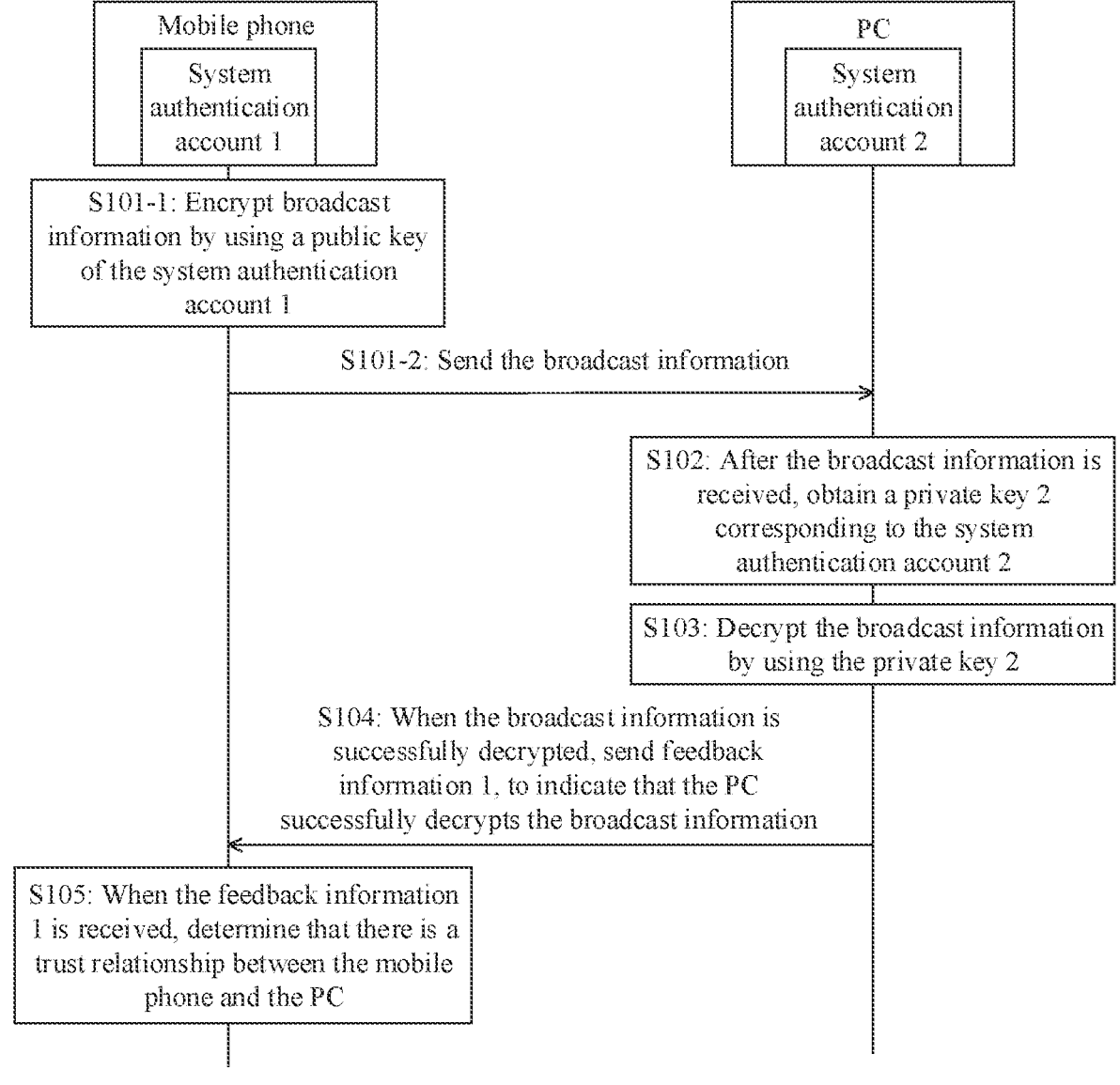
FIG. 4 is a first diagram of signaling interaction corresponding to a method according to an embodiment of this application.
Figure 5A:
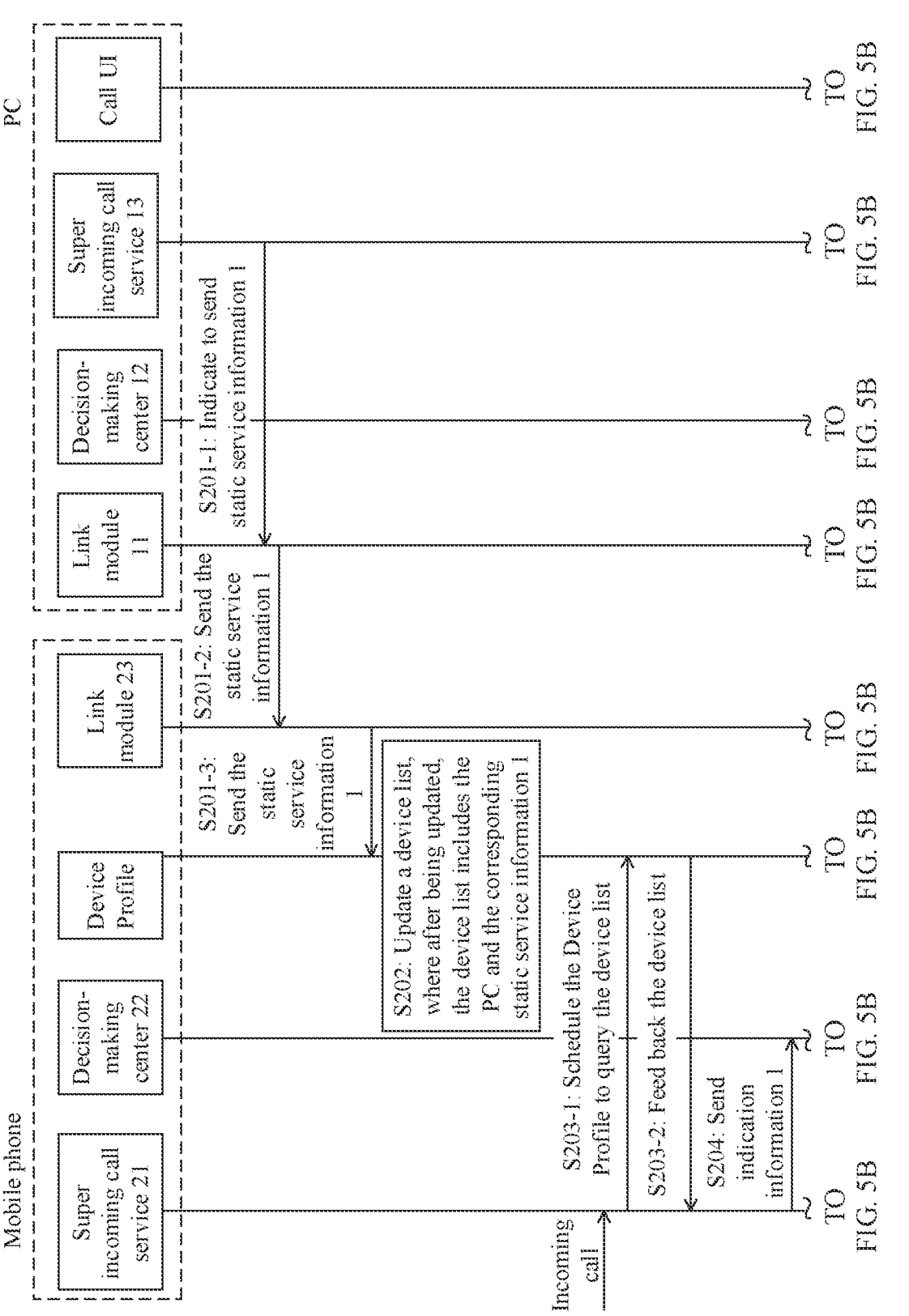
FIG. 5A to FIG. 5D are a second diagram of signaling interaction corresponding to a method according to an embodiment of this application.
Figure 5B:
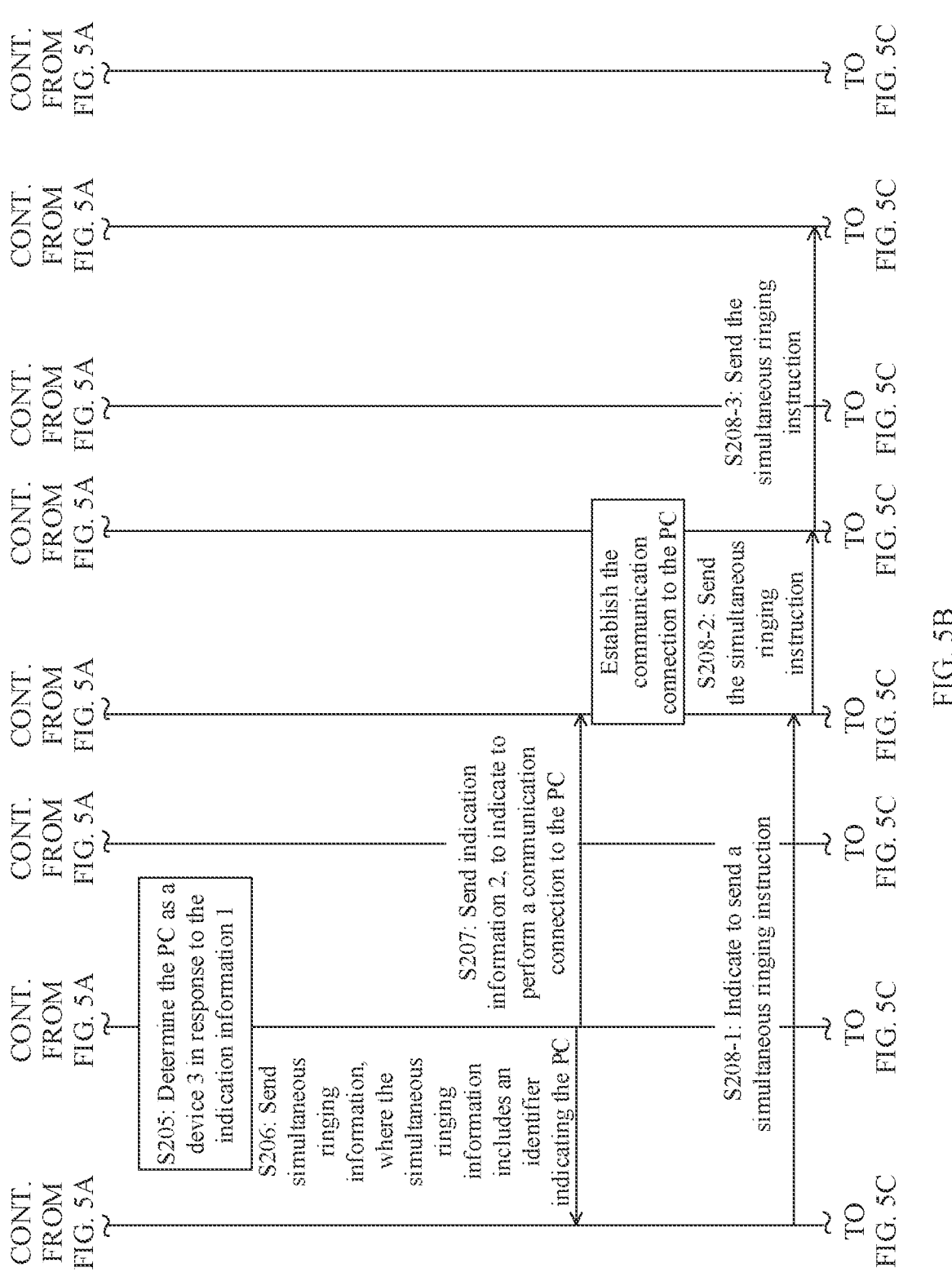
Figure 5C:
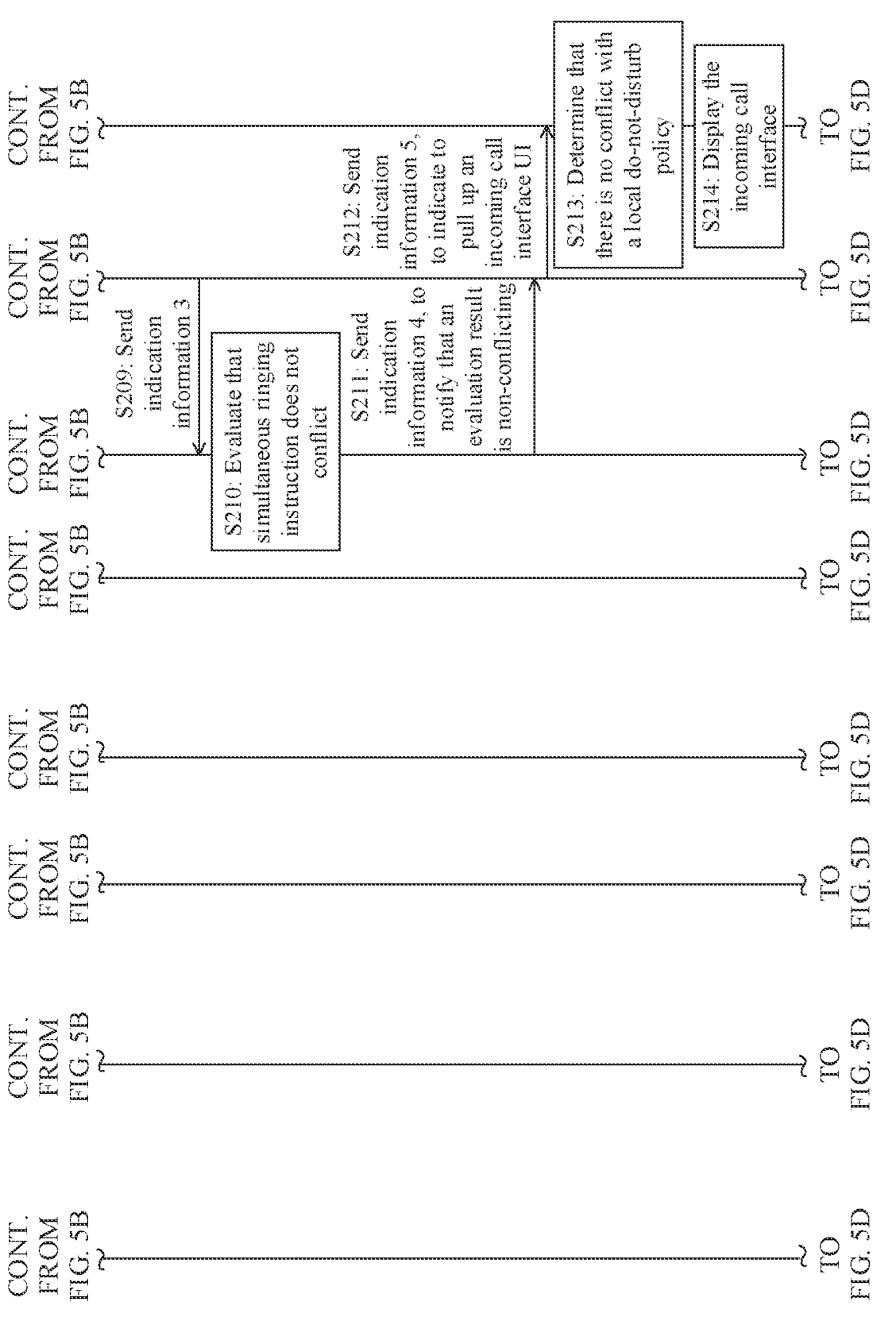
Figure 5D:
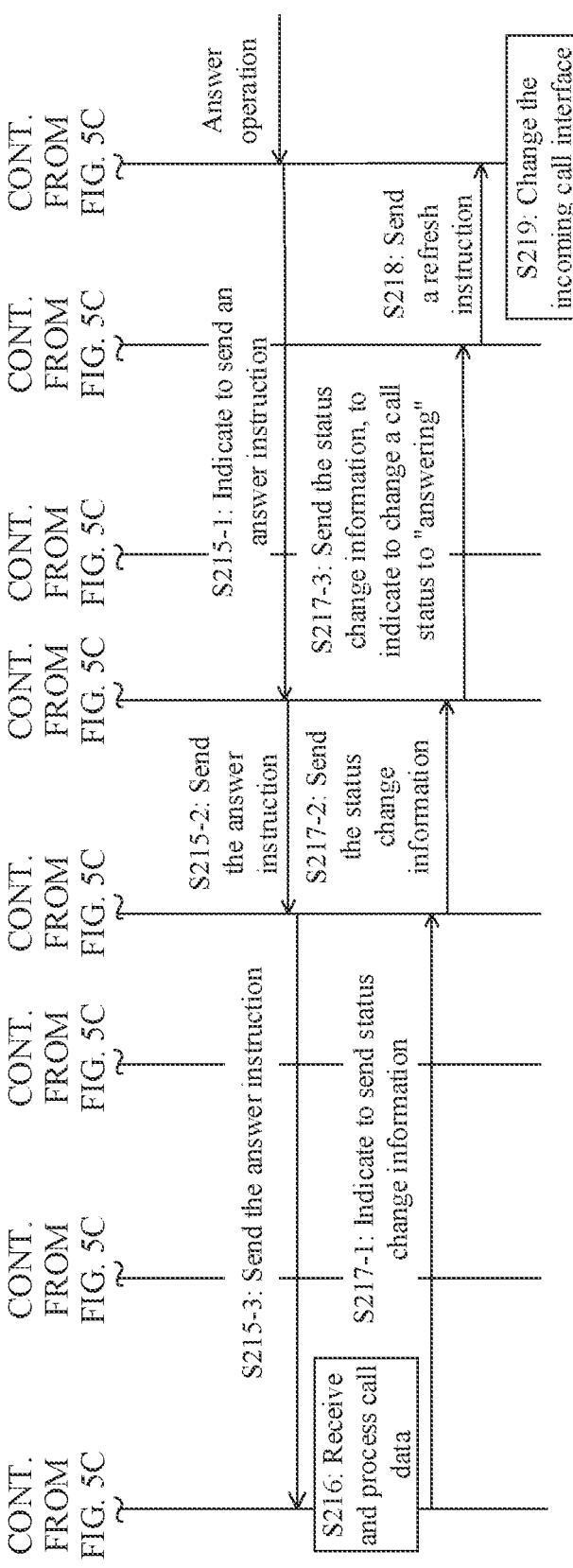

In this embodiment of this application, the mobile phone needs to discover a surrounding electronic device, and determine whether there is a trust relationship between the mobile phone and the surrounding electronic device. For example, when a user carrying the mobile phone walks into a room in which a PC is placed, as shown in FIG. 4, the method includes the following steps.

S101-1: The mobile phone encrypts broadcast information by using a public key of a system authentication account 1.

S101-2: The mobile phone sends the broadcast information.

In some embodiments, the mobile phone may send the broadcast information by using a near field communication technology, to ensure that an electronic device that is relatively close to the mobile phone can receive the broadcast information. For implementation of the near field communication technology, refer to a related technology. Details are not described herein.

In addition, the broadcast information sent by the mobile phone includes the encrypted system authentication account 1, and the system authentication account 1 is a system authentication account to which the mobile phone is logging in.

In some embodiments, the system authentication account may be a registration account provided by a cloud server, and each system authentication account may correspond to one public key, used to encrypt information associated with the system authentication account. Public keys of all system authentication accounts may be stored in the cloud server. For example, the cloud server stores a public key 1 corresponding to the system authentication account 1. In addition, the mobile phone may exchange data with the cloud server to obtain the public key 1 corresponding to the system authentication account 1.

For example, when logging in to the system authentication account 1, the mobile phone may obtain the corresponding public key 1 by sending a public key request to the cloud server. In this way, the mobile phone can encrypt the system authentication account 1 by using the public key 1, to obtain the broadcast information. For example, the account may be an Honor account. The mobile phone may first obtain, from an Honor cloud server, a public key corresponding to the logged Honor account, encrypt the Honor account by using the public key, and then generate a broadcast message.

In some embodiments, the mobile phone may send the broadcast information to the outside in real time. In some other examples, after a specific scenario is identified, the mobile phone may start sending the broadcast information to the outside. For example, the specific scenario may be that it is identified that the mobile phone changes from a static state to a moving state. For another example, the specific scenario may alternatively be that it is identified that a location of the mobile phone changes. For still another example, the specific scenario May alternatively be that the mobile phone receives a packet 1 sent by a router 1. The router 1 is a wireless access point currently accessed by the mobile phone, and the packet 1 is a notification packet that is sent by the router 1 to the accessed mobile phone after the router 1 detects access by another device.

S102: After receiving the broadcast information, the PC obtains a private key 2 corresponding to a system authentication account 2.

The system authentication account 2 is a system authentication account to which the PC currently logs in. In addition, it may be understood that the cloud server stores not only a public key corresponding to a system authentication account, but also a private key corresponding to the system authentication account. A public key and a private key that correspond to a same account match each other. In other words, data encrypted by using the public key may be decrypted by using the private key corresponding to the same account.

In some examples, after logging in to the system authentication account 2, the PC may obtain, from the cloud server, the private key 2 corresponding to the system authentication account 2, and store the obtained private key 2 in a trusted storage location, for example, referred to as a storage area 1. In this way, the PC can query and use the private key 2 based on a business requirement. Certainly, after logging in to another system authentication account, the PC may further delete the private key 2 in the storage area 1, and download a private key of the another system authentication account from the cloud server. The newly downloaded private key may also be stored in the storage area 1.

In this way, in this embodiment of this application, after receiving the broadcast information, the PC determines that the broadcast information has encrypted content. The PC may then read a stored private key from the storage area 1, for example, read the private key 2. After the private key 2 is read, the procedure proceeds to S103.

S103: The PC decrypts the broadcast information by using the private key 2.

In some embodiments, if the system authentication account 1 and the system authentication account 2 are a same account, the private key 2 matches the public key 1. In this case, the PC can successfully decrypt the broadcast information by using the private key 2. If the system authentication account 1 and the system authentication account 2 are not a same account, the private key 2 and the public key 1 do not match. In this case, the PC cannot decrypt the broadcast information by using the private key 2.

In some embodiments, after successfully decoding the broadcast information, the PC may determine that there is a trust relationship between the PC and the mobile phone. Then the PC may write the mobile phone into a trusted device list. All devices in the trusted device list are trusted devices of the PC. When the trusted device list includes the mobile phone, the PC may securely receive data sent by the mobile phone, to reduce a possibility of unauthorized access to data.

S104: When the broadcast information is successfully decrypted, the PC sends feedback information 1 to the mobile phone, to indicate that the PC successfully decrypts the broadcast information.

In some embodiments, the feedback information 1 may carry an identifier indicating that the decryption succeeds, and certainly, may also carry a system authentication account, for example, the system authentication account 2, to which the PC currently logs in.

In addition, when the broadcast information is not successfully decrypted, the PC may not respond to the broadcast information, in other words, does not send any information to the mobile phone. Alternatively, the PC sends feedback information 2 to the mobile phone, to indicate that the PC fails to decrypt the broadcast information. The feedback information 2 may carry an identifier indicating that the decryption fails.

In another embodiment, before the PC sends the feedback information 1, the PC may further encrypt the feedback information 1 by using the public key corresponding to the system authentication account 2, to improve security of the feedback information 1.

S105. When receiving the feedback information 1, the mobile phone determines that there is a trust relationship between the mobile phone and the PC.

In some embodiments, when receiving the feedback information 1, the mobile phone may determine that there is a trust relationship between the mobile phone and the PC. On this basis, the mobile phone may write the PC into a trusted device list.

In addition, when the feedback information 1 is encrypted, the mobile phone may decrypt the feedback information 1 by using the private key 2 corresponding to the system authentication account 1. When the feedback information 1 is successfully decrypted, the mobile phone determines that there is a trust relationship between the mobile phone and the PC, and writes the PC into the trusted device list. When the trusted device list of the mobile phone includes the PC, the mobile phone may securely receive data sent by the PC, to reduce a possibility of unauthorized access to data.

In this embodiment of this application, in a scenario in which there is a trust relationship between the mobile phone and the PC, and a distance between the mobile phone and the PC meets a requirement for near field communication, when the mobile phone and the PC need to exchange data with each other, a mutual trusted near field communication connection, namely, a trusted connection, may be automatically established.

In some examples, before a trusted connection is established each time, it is determined, by querying the trusted device list, whether there is a trust relationship between the mobile phone and the PC. In some other examples, before a trusted connection is established each time, it is necessary to determine, through S101~S105, whether there is a trust relationship between the mobile phone and the PC. Certainly, in another example, if it is determined, through S101~S105, that there is a trust relationship between the mobile phone and the PC, when the system authentication account of the mobile phone and/or the system authentication account of the PC are or is not changed, it is not necessary to repeatedly confirm the trust relationship. Certainly, when the system authentication account of the mobile phone is changed, the mobile phone may clear the trusted device list, and re-determine whether there is a trust relationship between the mobile phone and a peripheral device.

In some embodiments, after receiving an incoming call, the mobile phone may use the trusted connection to indicate a trusted device (for example, the PC) to collaborate to perform incoming call reminding. As shown in FIG. 5A to FIG. 5D, the method may further include the following steps.

S201-1: A super incoming call service 13 indicates a Link module 11 to send static service information 1 to the mobile phone.

In some embodiments, the super incoming call service 13 is a service provided by a service layer of the PC. The super incoming call service 13 indicates, by sending indication signaling, the Link module 11 to periodically send static service information to the mobile phone.

S201-2: The Link module 11 sends the static service information 1 to a Link module 23.

S201-3: The Link module 23 forwards the static service information 1 to a Device Profile.

The Link module 11 is an underlying module that is in the PC and that implements a communication function, and is configured to establish a communication connection and exchange data with another device. The Link module 23 is an underlying module that is in the mobile phone and that implements a communication function, and is configured to establish a communication connection and exchange data with another device. In other words, data interaction between the mobile phone and the PC may be implemented by using the Link module 11 and the Link module 23. Certainly, the foregoing description is only one implementation in which the PC and the mobile phone exchange data (for example, transmit static service information). In another embodiment, the PC and the mobile phone may alternatively indirectly exchange data through forwarding by using the cloud server.

In some embodiments, under an indication of the super incoming call service 13, the Link module 11 may periodically send static service information to the Link module 23, for example, send the static service information 1, and then the Link module 23 forwards the static service information 1 to the Device Profile of the mobile phone.

In an implementation, the Link module 23 may forward the static service information 1 to the Device Profile of the mobile phone by using a service registration/device management module. In this way, the static service information 1 sent by the PC can be maintained by the Device Profile, for example, written into a device list.

In another implementation, the Link module 23 may alternatively directly forward the static service information 1 to the Device Profile of the mobile phone.

S202: The Device Profile updates the device list, where after being updated, the device list includes the PC and the corresponding static service information 1.

The Device Profile may be a service interface provided by a service layer of the mobile phone.

In some embodiments, after receiving the static service information 1, the mobile phone schedules the Device Profile based on the static service information 1 to update the device list. For an implementation process, refer to the description in the foregoing embodiment. Details are not described herein again.

In some other embodiments, the Device Profile may alternatively be a service interface provided by a service layer of the cloud server. To be specific, when the PC determines that near field communication can be performed between the PC and the mobile phone, the super incoming call service 13 may indicate the Link module 11 to periodically send the static service information to the cloud server, and the Device Profile in the cloud server may update, based on the static service information, the device list corresponding to the mobile phone.

In addition, after the mobile phone receives the incoming call, the procedure proceeds to S203-1. It may be understood that, even after the procedure proceeds to S203-1, the mobile phone can still receive static service information sent by another device (including the PC), and update the device list.

S203-1: A super incoming call service 21 schedules the Device Profile to query the device list.

In some embodiments, the super incoming call service 21 is a service provided by the service layer of the mobile phone. When the Device Profile is configured in the mobile phone, the super incoming call service 21 may schedule the Device Profile by using the service registration/device management module, to query a latest device list. When the Device Profile is configured on the cloud server, the super incoming call service 21 may send the query information 1 to the cloud server. The query information 1 carries an identifier of the mobile phone, and is used to indicate the cloud server to schedule the Device Profile to query the latest device list corresponding to the mobile phone.

S203-2: The Device Profile feeds back the device list to the super incoming call service 21.

As depicted in the foregoing embodiment, the device list includes an identifier of a device 2 and static service information corresponding to the device 2, for example, an identifier indicating the PC and the static service information 1 corresponding to the PC. The device list is updated in real time to ensure that all devices 2 indicated by the device list can establish near field communication connections to the mobile phone.

In an implementation, the Device Profile may alternatively send the device list to the super incoming call service 21 by using the service registration/device management module.

S204: The super incoming call service 21 sends indication information 1 to a decision-making center 22.

In some embodiments, the decision-making center 22 is a program module configured in the mobile phone. The indication information 1 is used to indicate the decision-making center 22 to determine a device 3 from a collaborative system for a currently received incoming call.

The super incoming call service 21 registers a simultaneous ringing service with/subscribes to a simultaneous ringing service in the decision-making center 22 by sending the indication information 1. After the simultaneous ringing service is registered, the decision-making center 22 starts to execute a "determining the device 3" task.

In another embodiment, before registering/subscribing to the simultaneous ringing service, in other words, before S204, the super incoming call service 21 may further monitor whether the mobile phone currently meets a simultaneous ringing requirement, for example, whether a function of requesting another device to simultaneously vibrate is enabled. When the simultaneous ringing requirement is met, the procedure proceeds to S204.

In addition, after registration of/subscription to the simultaneous ringing service is performed, the indication information 1 may further indicate the decision-making center 22 to determine the device 3 from the devices 2 indicated by the device list. In this case, the procedure may proceed to S205.

S205: The decision-making center 22 determines the PC as the device 3 in response to the indication information 1.

In some embodiments, for a process of determining the device 3 from the devices 2 indicated by the device list, refer to the foregoing embodiment. To be specific, the device 3 may be determined from the devices 2 based on usage statuses, a priorities, and event reminder modes of the devices 2. It may be understood that the device 3 determined by the decision-making center 22 is not limited to one device, and determining the PC as the device 3 is only an example, and is not used as a limitation to this embodiment of this application.

Figure 6A:
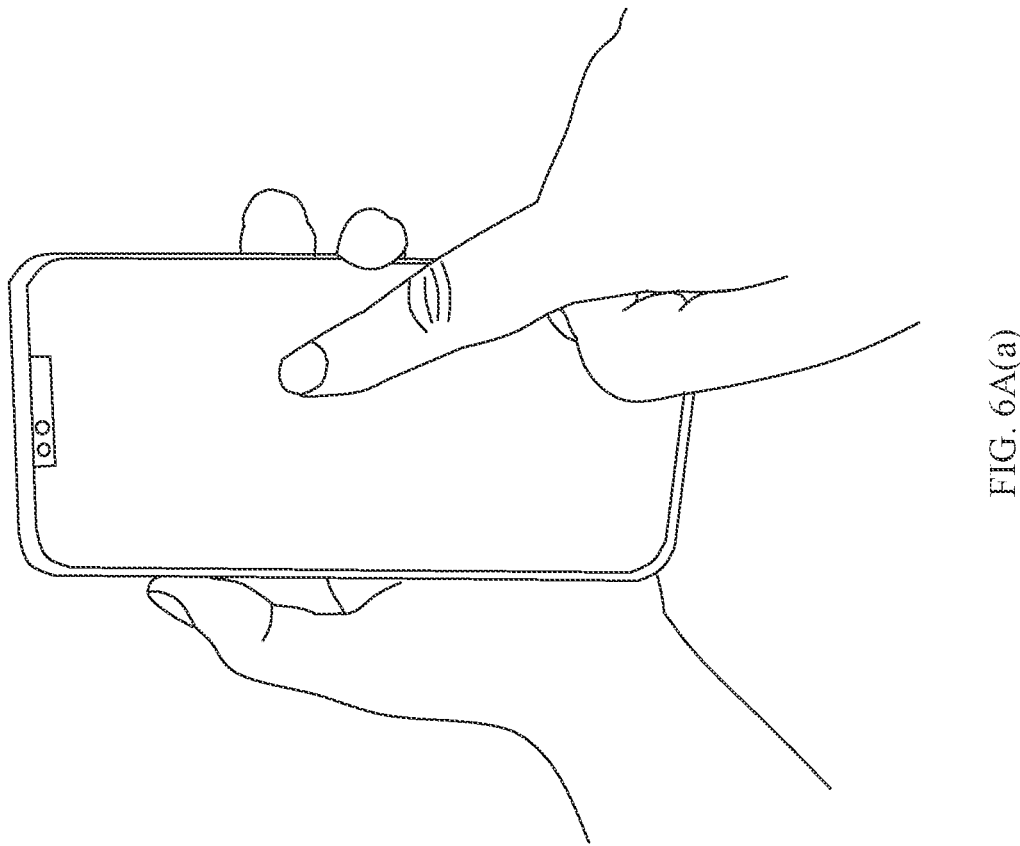
FIGS. 6A(a) and 6A(b) are a first example diagram of a scenario according to an embodiment of this application.
Figure 6A:
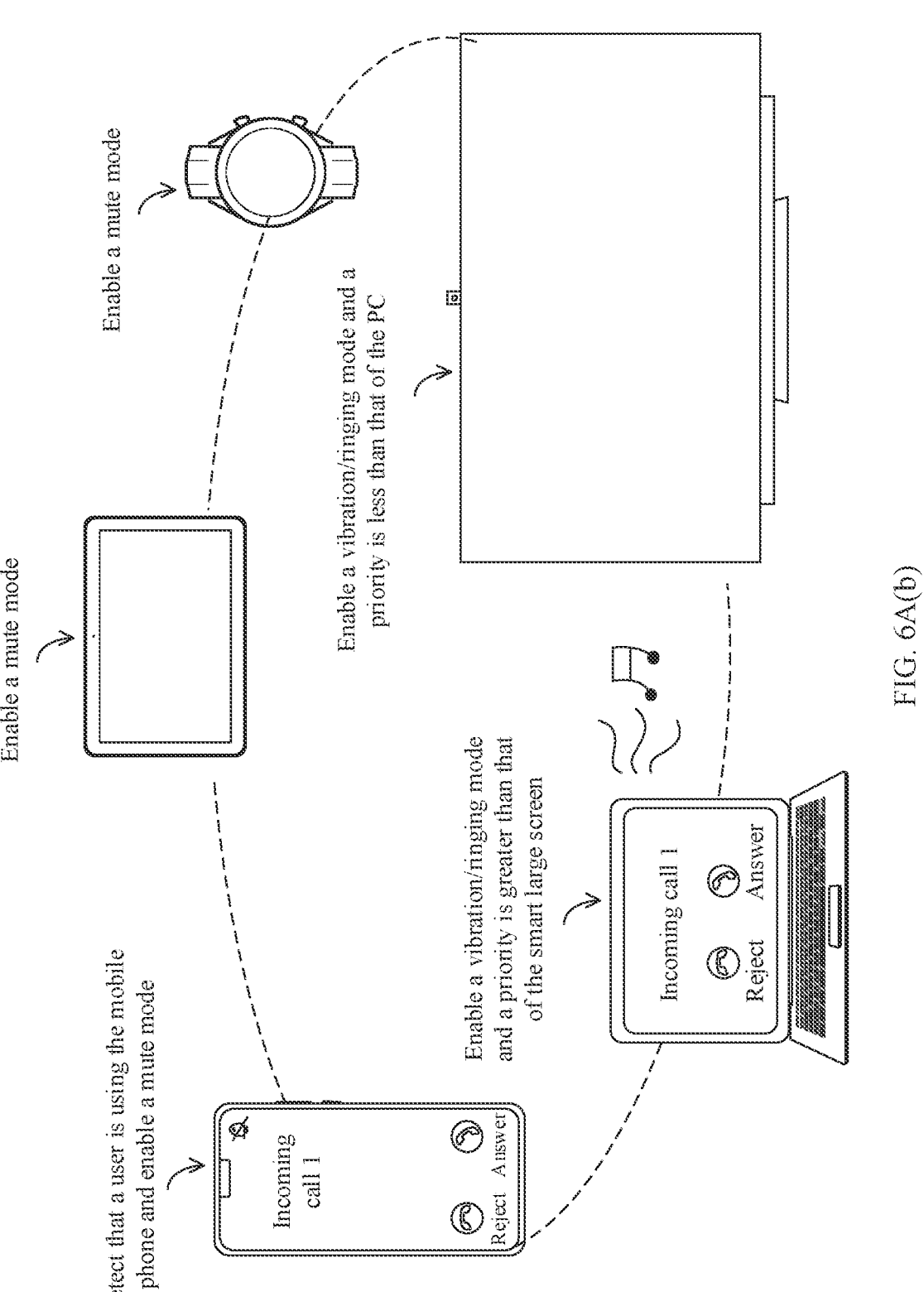

For example, as shown in FIG. 6A (a), the devices 2 include a tablet computer, a notebook computer, a smart large screen, and a smartwatch. The mobile phone may receive a user operation, and preconfigure priorities of different types of devices, for example, configure that a priority of the smartwatch is greater than that of the tablet computer, the priority of the tablet computer is the same as that of the PC, and the priority of the PC is greater than that of the smart large screen.

When the user uses the mobile phone, for example, when the mobile phone receives a user operation, or runs an application in a foreground, or collects facial feature information, it may be determined that the mobile phone is in an in-use state. In this scenario, if a mute mode is enabled on the mobile phone, and as shown in FIG. 6A(b), the PC and the smart large screen are in a vibration on ring mode, and the watch and the tablet computer are in the mute mode, after the mobile phone receives an incoming call, the PC that is in the vibration on ring mode and whose priority is higher may be determined as the device 3, in other words, the PC collaborates to perform incoming call reminding, for example, rings.

Figure 6B:
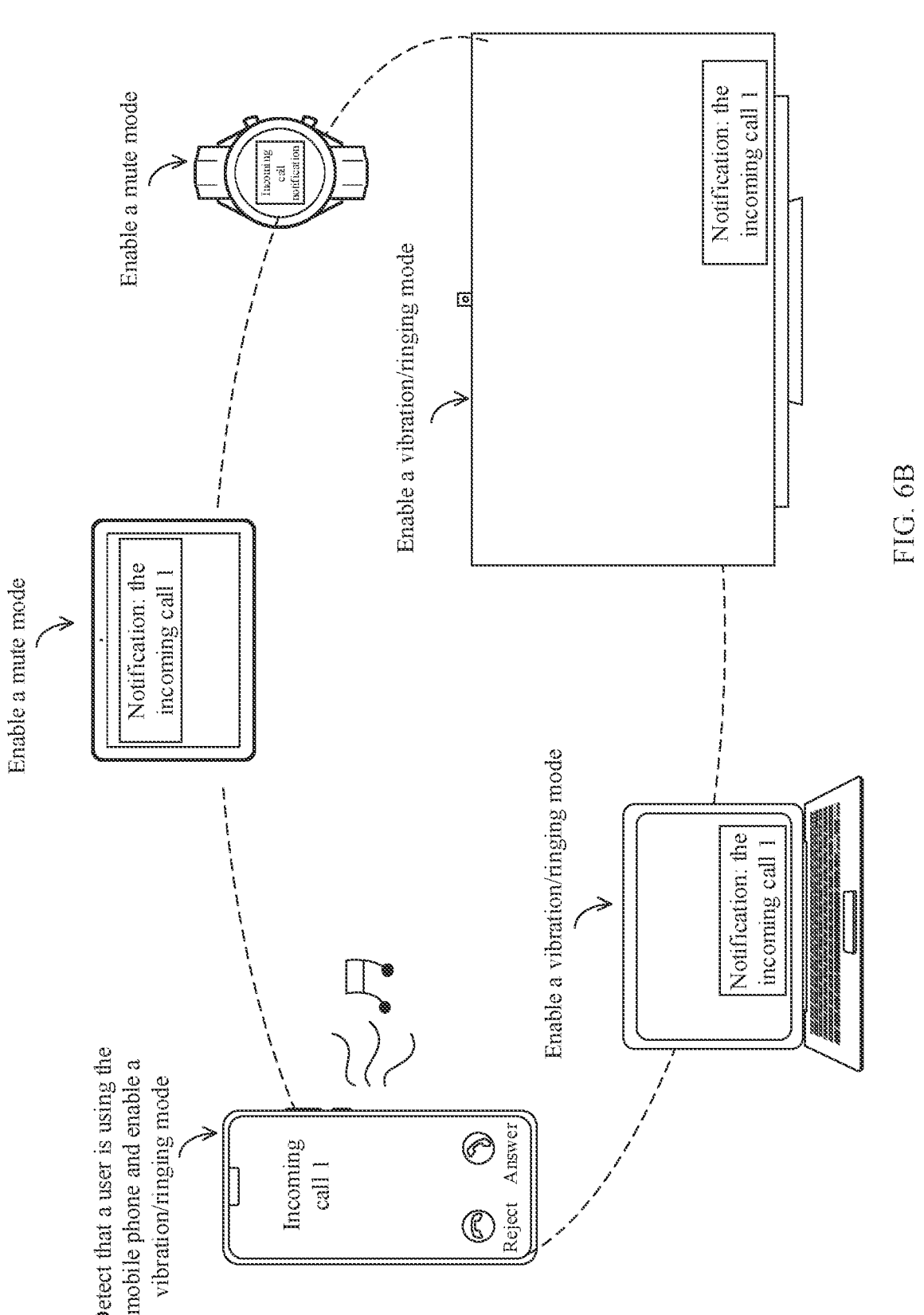
FIG. 6B is a second example diagram of a scenario according to an embodiment of this application.

For another example, a vibration on ring mode is enabled on the mobile phone and a ringing mode is configured for reminding. If the mobile phone receives an incoming call when the user uses the mobile phone, regardless of whether the vibration on ring mode is enabled on another device (for example, as shown in FIG. 6B, the PC and the smart large screen are in the vibration on ring mode, and the watch and the tablet computer are in the mute mode), the mobile phone may determine each of the tablet computer, the notebook computer, the smart large screen, and the smartwatch as the device 3. Certainly, when the vibration on ring mode is enabled on the mobile phone, and the user is also using the mobile phone, the mobile phone performs vibration on ring reminding to better remind the user to pay attention to the incoming call and process the incoming call. In this scenario, the devices 3 do not need to ring. However, the mobile phone may indicate the devices 3 (the tablet computer, the notebook computer, the smart large screen, and the smartwatch) to display incoming call notifications.

Figure 7A:
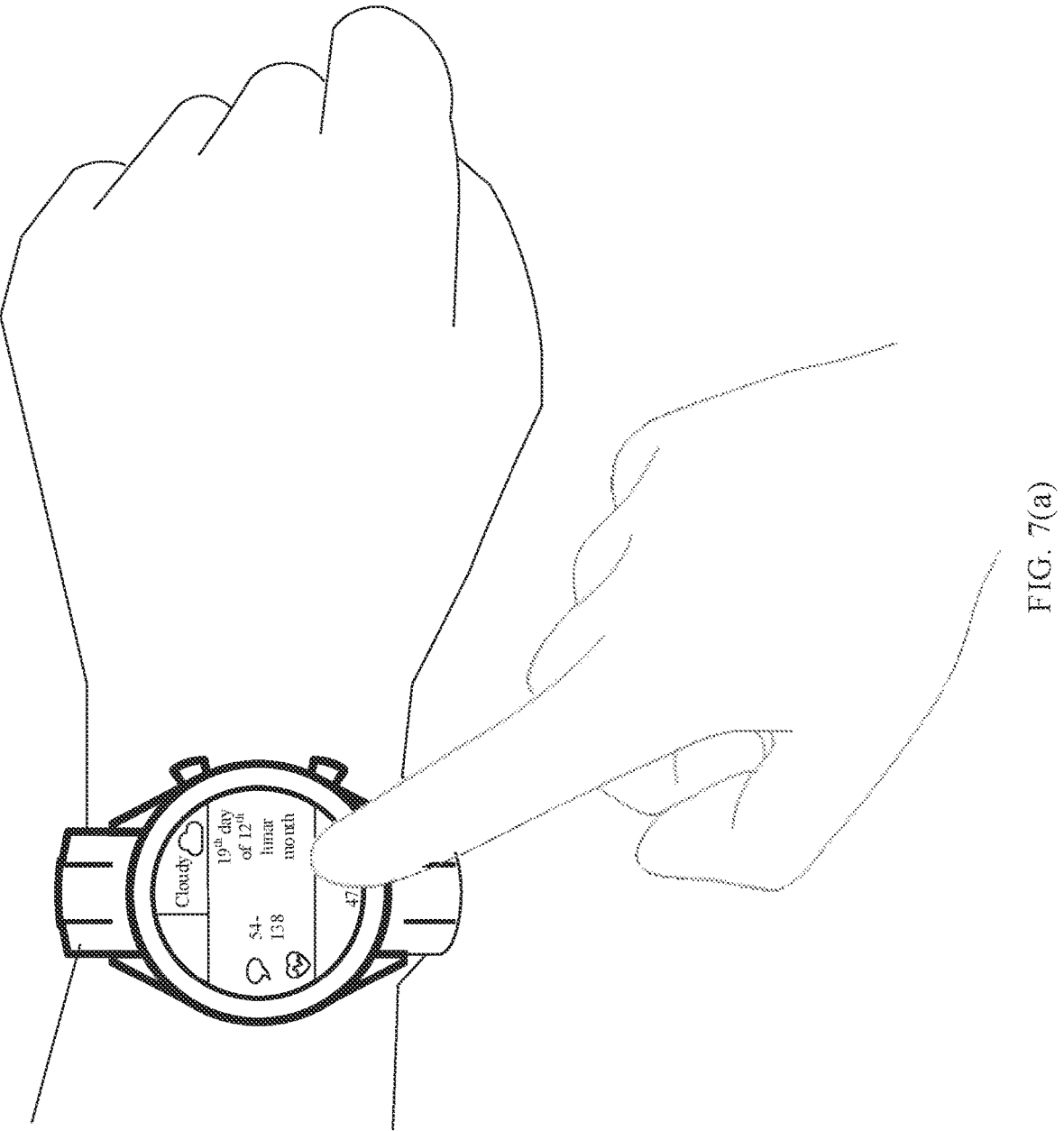
FIG. 7(a) and FIG. 7(b) are a third example diagram of a scenario according to an embodiment of this application.

For another example, as shown in FIG. 7(a), when the user uses the smartwatch, for example, when the smartwatch receives a user operation or collects a facial feature, it may be determined that the smartwatch is in the in-use state. In this scenario, the smartwatch may be determined as the device 3. In addition, because it is detected that no user is using the tablet computer, the notebook computer, or the smart large screen, none of the tablet computer, the notebook computer, and the smart large screen are used as devices 3.

In addition, when the mobile phone determines that the user wears the smartwatch, the priority of the watch is greater than that of another device in the collaborative system, and the smartwatch may also be determined as the device 3. In another example, after receiving an incoming call, the mobile phone may determine one with a highest priority in the tablet computer, the notebook computer, the smart large screen, and the smartwatch, for example, the smartwatch, as the device 3, regardless of whether the mobile phone is in the in-use state.

S206: The decision-making center 22 sends simultaneous ringing information to the super incoming call service 21, where the simultaneous ringing information includes the identifier indicating the PC.

In some embodiments, when the decision-making center 22 determines a plurality of devices 3, the simultaneous ringing information may alternatively include identifiers indicating the plurality of devices 3. When the determined devices 3 include the PC, the simultaneous ringing information includes the identifier indicating the PC.

S207: The decision-making center 22 sends indication information 2 to the Link module 23, to indicate to perform a communication connection to the PC.

The Link module 23 is an underlying module that is in the mobile phone and that implements the communication function, and is configured to establish a communication connection and exchange data with another device.

In some embodiments, the Link module 23 may perform signaling interaction with the PC based on profile information in the static service information 1. In this way, a communication connection, namely, a service link, is established between the PC and the mobile phone. Certainly, when the simultaneous ringing information indicates a plurality of devices 3, communication connections to the plurality of devices 3 may be successively established. During establishment of a communication connection to each device 3, the mobile phone may send a corresponding simultaneous ringing instruction to the device 3. The following still uses an example in which the device 3 is the PC for description.

> S208-1: The super incoming call service 21 indicates the Link module 23 to send a simultaneous ringing instruction to the PC.
> S208-2: The Link module 23 sends the simultaneous ringing instruction to the Link module 11.

In some embodiments, after the communication connection is established between the mobile phone and the PC, the super incoming call service 21 indicates the Link module 23 to send the simultaneous ringing instruction to the PC, for example, send the simultaneous ringing instruction to the Link module 11. The simultaneous ringing instruction includes the identifier indicating the mobile phone. In this case, after receiving the simultaneous ringing instruction, the PC may identify that the mobile phone requests call service collaboration.

> S208-3: The Link module 11 sends the simultaneous ringing instruction to the super incoming call service 13.

After the super incoming call service 13 (namely, a service provided by the service layer of the PC) receives the simultaneous ringing instruction, the PC may evaluate whether a device, for example, the mobile phone, corresponding to the simultaneous ringing instruction has permission to indicate the PC to execute a collaborative task. In this way, when the mobile phone has the permission to indicate collaboration, the PC can determine to collaborate with the mobile phone to perform incoming call reminding. In other words, after the super incoming call service 13 receives the simultaneous ringing instruction, the procedure proceeds to S209.

> S209: The super incoming call service 13 sends indication information 3 to a decision-making center 12.

In some embodiments, the decision-making center 12 may be a software module provided by the service layer of the PC. The super incoming call service 13 sends the indication information 3 to the decision-making center 12, to indicate to register a simultaneous ringing service for the incoming call of the mobile phone with the decision-making center 12. Then the decision-making center 12 may evaluate, in response to the indication information 3, whether collaboration requested by the simultaneous ringing instruction causes a conflict.

> S210: The decision-making center 12 determines that the simultaneous ringing instruction does not conflict.

In some embodiments, the decision-making center 12 may evaluate, by detecting whether the PC meets the foregoing scenario condition 1, whether the collaboration requested by the received simultaneous ringing instruction causes a conflict.

For example, the scenario condition 1 may include that the PC is executing a special task, for example, is answering another incoming call, is performing multi-screen collaboration, or is collaborating on a service requested by another device. For another example, the scenario condition 1 may include that a do-not-disturb mode is enabled (in other words, a first function is enabled) on the PC, and the PC enters a corresponding do-not-disturb time period (also referred to as a first time period). When the do-not-disturb mode is enabled on the PC, and system time belongs to the corresponding do-not-disturb time period, the PC blocks all call requests. The call requests include an incoming call request received by the PC and a simultaneous ringing instruction received by the PC. In other words, in the do-not-disturb time period, the PC does not respond to the received incoming call request and simultaneous ringing instruction, for example, does not display an incoming call interface or a notification, nor vibrates, rings or vibrates/rings. Certainly, the PC may record a received call request. After the system time enters a non-do-not-disturb time period from the do-not-disturb time period, the PC may display, by displaying a notification, the call request received in the do-not-disturb time period. In addition, in the do-not-disturb time period, in response to an operation indicating to display a blocked message by the user, the PC may also display, by displaying a notification, the call request received in the do-not-disturb time period. Alternatively, in the do-not-disturb time period, when receiving an operation indicating to disable the do-not-disturb mode by the user, the PC may display, by displaying a notification, the call request received in the do-not-disturb time period.

For another example, the scenario condition 1 may include that the PC is using an application 1 (namely, a first application). The application 1 is an application whose priority is greater than that of a call service. When identifying that the application 1 is running in a foreground, the decision-making center 12 determines that the application 1 is being used.

In this case, after the PC receives the simultaneous ringing instruction, the super incoming call service 13 registers the simultaneous ringing service with the decision-making 1. After the simultaneous ringing service is registered, when the decision-making center 12 detects that the PC meets any preset scenario condition 1, the decision-making center 12 determines that the simultaneous ringing instruction conflicts, and the PC does not continue to respond to the simultaneous ringing instruction. When detecting that the PC does not meet the preset scenario condition 1, the decision-making center 12 determines that the simultaneous ringing instruction does not conflict, and the procedure proceeds to S211.

> S211: The decision-making center 12 sends indication information 4 to the super incoming call service 13, to notify that an evaluation result is non-conflicting.
> S212: The super incoming call service 13 sends indication information 5 to a call UI, to indicate to pull up an incoming call interface UI.

In some embodiments, before the call UI pulls up the incoming call interface UI, a local do-not-disturb policy may be further used to further determine whether the PC can collaborate on incoming call reminding. For example, the local do-not-disturb policy may be checking whether a device list 1 preconfigured in the PC includes the device identifier corresponding to the mobile phone. The device list 1 records a device identifier, and an electronic device indicated by the device identifier has no permission to indicate the PC to execute a call service collaborative task.

It may be understood that the local do-not-disturb policy can implement blocking of a simultaneous ringing instruction in a device dimension, and the do-not-disturb mode can implement blocking of a simultaneous ringing instruction in a time dimension.

In another possible embodiment, if the PC includes no decision-making center 12, the method provided in this embodiment may not include S209~S211. After S208-3, to be specific, after the super incoming call service 13 determines to receive the simultaneous ringing instruction, the procedure proceeds to S212. In S212, before the call UI pulls up the incoming call interface UI, it may be further detected whether the PC meets the preconfigured scenario condition 1. When it is determined that the scenario condition 1 is not met and it is determined that the PC is not subject to the local do-not-disturb policy, the procedure proceeds to S213.

S213: The call UI determines that there is no conflict with the local do-not-disturb policy.

S214: The call UI displays the incoming call interface.

In some embodiments, during display of the incoming call interface, the PC may perform incoming call reminding. In some examples, the PC may perform incoming call reminding in a reminder manner set by the PC. In some other embodiments, before performing incoming call reminding, the PC may obtain static service information of the mobile phone. When the static service information of the mobile phone indicates that the mobile phone is in the in-use state, incoming call reminding is performed only by displaying the incoming call interface. In addition, the incoming call interface may be a display interface for an incoming call, or may be an interface for displaying an incoming call notification.

For example, as shown in FIG. 6A (b), the collaborative system includes the mobile phone, the PC, the tablet computer, the smartwatch, the smart large screen, and the like. When the user uses the mobile phone, the mute mode is enabled on all of the mobile phone, the tablet computer, and the smartwatch (in other words, a preconfigured incoming call reminder manner is a mute notification), and the vibration on ring mode is enabled on the PC and the smart large screen. The PC and the smart large screen on which vibration on ring mode is enabled may also be referred to as fifth devices.

In addition, the priority of the PC is greater than that of the smart large screen. In this scenario, after receiving an incoming call (for example, referred to as a third incoming call request), the mobile phone sends a simultaneous ringing instruction (refer to S208-1 to S208-3) to the PC, in other words, sends fifth information. After receiving the simultaneous ringing instruction, the PC determines that the simultaneous ringing instruction does not conflict (refer to S209 to S211), in other words, the PC determines that a third condition is not met. In this case, the PC performs incoming call reminding in a configured reminder manner (for example, ringing, vibration, or vibration on ring). For example, when the reminder manner preconfigured in the PC is ringing, the PC starts to ring.

In addition, the third condition may include at least one of the following: (1) running the first application in the foreground, where the first application is an application whose priority is greater than that of the call service; (2) executing a first task, where the first task includes a collaborative task and a call task; and (3) enabling the first function, where the first function is used to indicate to block all incoming call requests in the first time period, and a first list preconfigured in the fifth device includes a first device.

In another possible embodiment, as shown in FIG. 6B, the collaborative system includes the mobile phone, the PC, the tablet computer, the smartwatch, and the smart large screen. The vibration on ring mode is enabled on the mobile phone, and a reminder manner is configured as ringing. When the user uses the mobile phone, the mobile phone receives an incoming call (for example, referred to as a second incoming call request), and may separately send simultaneous ringing instructions (also referred to as fourth information) to the smartwatch, the tablet computer, the notebook computer, and the smart large screen. The simultaneous ringing instruction includes an identifier indicating to display a notification. After receiving the simultaneous ringing instructions, the smartwatch, the tablet computer, the notebook computer, and the smart large screen determine that the simultaneous ringing instructions do not conflict, and display reminder notifications for the incoming call. Meanwhile, when receiving the incoming call, the mobile phone rings.

To be specific, when the mobile phone receives the second incoming call request under a second condition, in other words, when the user is using the mobile phone, if an incoming call reminder manner preconfigured in the mobile phone is vibration and/or ringing, the mobile phone performs reminding in the corresponding incoming call reminder manner in response to the second incoming call request. In addition, a device (namely, a second device) other than the mobile phone in the collaborative system may display an incoming call notification. It may be understood that, in this scenario, the second device does not ring and/or vibrate regardless of whether a preconfigured incoming call reminder manner is vibration and/or ringing.

In another embodiment, in a case of a plurality of devices 3, for example, when all of the tablet computer, the smart large screen, the notebook computer, and the smartwatch are devices 3, the mobile phone may successively send simultaneous ringing instructions to the devices 3 based on priorities until one device 3 collaborates to perform incoming call reminding. For example, if the smartwatch has a highest priority, the mobile phone first sends the simultaneous ringing instruction to the smartwatch (for an implementation process, refer to S207, S208-1, S208-2, and S208-3). If the smartwatch determines that the simultaneous ringing instruction does not conflict, and pulls up an incoming call interface (for an implementation process, refer to S209~S214), the smartwatch sends simultaneous ringing response information 1 to the mobile phone, to notify the mobile phone that the smartwatch currently starts to collaborate to perform incoming call reminding. After receiving the simultaneous ringing response information 1, the mobile phone no longer sends the simultaneous ringing instruction to a next device 3. If the smartwatch determines that the simultaneous ringing instruction conflicts, the smartwatch sends simultaneous ringing response information 2 to the mobile phone, to notify the mobile phone that the smartwatch currently cannot collaborate to perform incoming call reminding. After receiving the simultaneous ringing response information 2, the mobile phone determines that a priority of the tablet computer is less than that of the smartwatch but greater than that of another device. Then the mobile phone continues to send the simultaneous ringing instruction to the tablet computer. Similarly, the tablet computer may determine, based on whether the simultaneous ringing instruction conflicts, whether to feed back collaboration response information 1 or feed back collaboration response information 2 to the mobile phone. In this way, the mobile phone can also determine whether to send the simultaneous ringing instruction to a next device 3.

In some other embodiments, in a case of the plurality of devices 3, simultaneous ringing instructions may alternatively be synchronously sent to all the devices 3, to indicate all the devices 3 to collaborate to perform incoming call reminding.

Figure 7B:
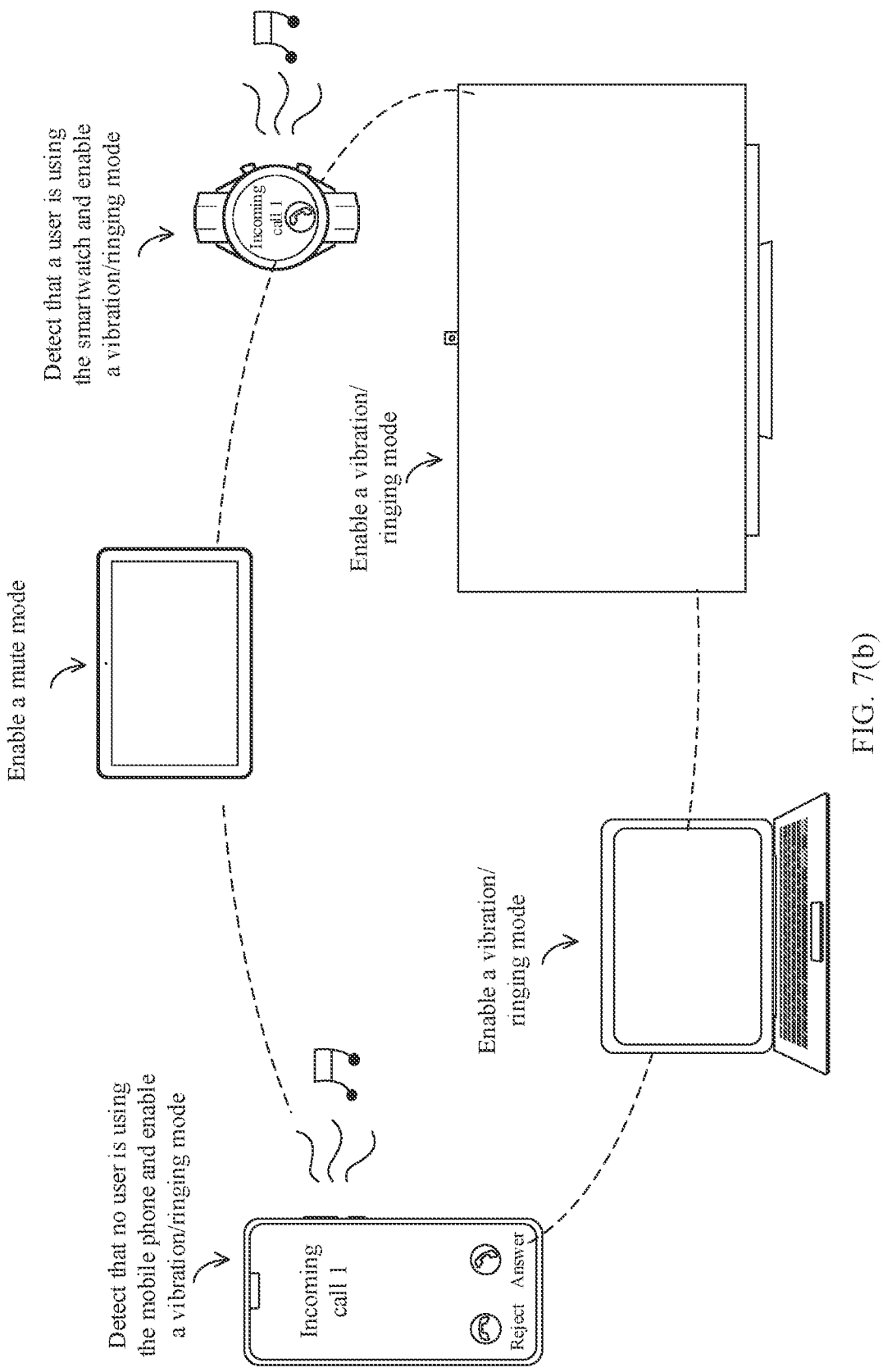

For another example, as shown in FIG. 7(*b*), the vibration on ring mode is enabled on all of the mobile phone, the PC, the smart large screen, and the smartwatch, and a configured reminder manner is ringing. In addition, the mute mode is enabled on the tablet computer. If the mobile phone receives an incoming call (for example, referred to as a fourth incoming call request) when the user uses the smartwatch, the mobile phone may ring. In addition, the mobile phone may further send a simultaneous ringing instruction to the smartwatch. After receiving the simultaneous ringing instruction, the smartwatch determines that the simultaneous ringing instruction does not conflict, and the smartwatch starts to ring.

In addition, in the foregoing scenario, if a device used by the user is the tablet computer, the mobile phone may also send a simultaneous ringing instruction to the tablet computer, to indicate the tablet computer to ring. In the foregoing scenario, if a device used by the user is the smart large screen, the mobile phone may also send a simultaneous ringing instruction to the smart large screen, to indicate the smart large screen to ring. In the foregoing scenario, if a device used by the user is the notebook computer, the mobile phone may also send a simultaneous ringing instruction to the notebook computer, to indicate the notebook computer to ring.

In other words, in the collaborative system, the device, other than the mobile phone, used by the user may be referred to as a seventh device. When a wearable device (namely, a third device) in the collaborative system is worn, the user is using the seventh device, and the third device and the seventh device are not a same device, the mobile phone may separately send simultaneous ringing instructions to the third device and the seventh device. In some embodiments, the mobile phone may send the simultaneous ringing instructions based on a priority sequence of the third device and the seventh device. For example, if a priority of the seventh device is greater than that of the third device, a simultaneous ringing instruction (for example, referred to as first information) is first sent to the seventh device. The seventh device may send first response information to the mobile phone (namely, the first device) under a fourth condition, to indicate that the seventh device rejects the simultaneous ringing instruction. For example, the fourth condition is met when the first application is run in a foreground of the seventh device, and a second application is an application whose priority is greater than that of the call service; the fourth condition is met when the seventh device executes the first task, and the first task includes the collaborative task and the call task; the fourth condition is met when the first function is enabled on the seventh device, and the first function is used to indicate to block all the incoming call requests in the first time period; and the fourth condition is met when a first list of the seventh device includes the first device.

After receiving the first response information, the mobile phone continues to send a simultaneous ringing instruction (for example, referred to as second information) to the third device. In addition, a device other than the first device, the third device, and the seventh device in the collaborative system may be referred to as an eighth device. After the first device receives the fourth incoming call request, the first device may further indicate the eighth device to display an incoming call notification for the fourth incoming call request.

Figure 8:
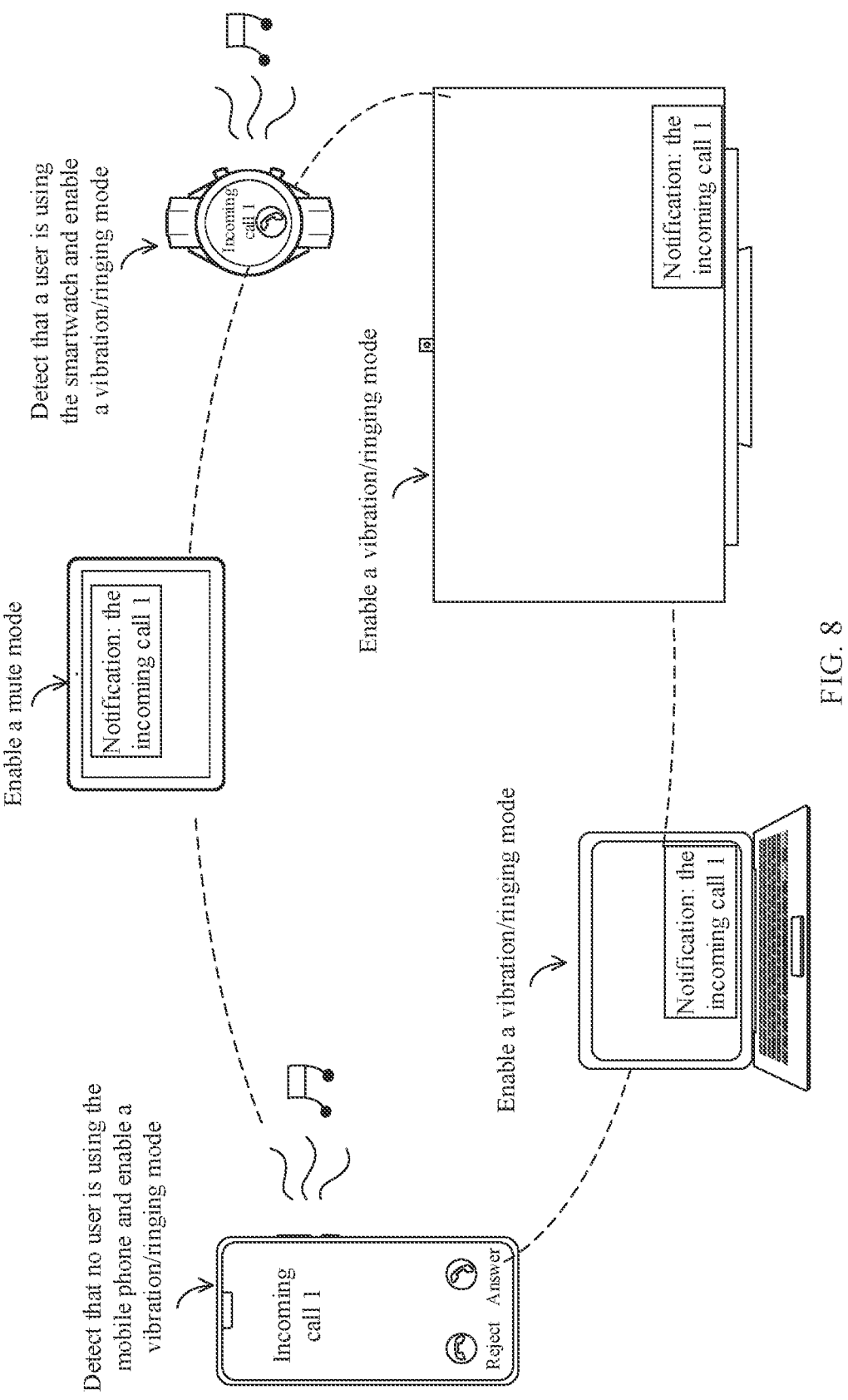
FIG. 8 is a fourth example diagram of a scenario according to an embodiment of this application.

In some other embodiments, as shown in FIG. 8, the vibration on ring mode is enabled on all of the mobile phone, the PC, the smart large screen, and the smartwatch, and a configured reminder manner is ringing. In addition, the mute mode is enabled on the tablet computer. After the mobile phone receives an incoming call when the user uses the smartwatch, the mobile phone rings. In addition, the mobile phone may send the simultaneous ringing instruction to the smartwatch. After the smartwatch receives the simultaneous ringing instruction and determines that the simultaneous ringing instruction does not conflict, the smartwatch may ring in response to the simultaneous ringing instruction. In addition, the mobile phone may further indicate the PC, the smart large screen, and the tablet computer to display incoming call notifications.

Then the PC may receive an operation indicating to answer or hang up the incoming call by the user. For example, the PC receives the operation indicating to answer the call, and the procedure may proceed to S215. S215-1: The call UI indicates the Link module 11 to send an answer instruction to the mobile phone.

In some embodiments, the call UI of the PC may notify the super incoming call service 13 that the operation indicating to answer the call by the user is received. Then the super incoming call service 13 sends the answer instruction to the mobile phone by using the Link module 11.

S215-2: The Link module 11 sends the answer instruction to the Link module 23.

S215-3: The Link module 23 sends the answer instruction to the super incoming call service 21.

In some embodiments, the Link module 11 sends the answer instruction to the super incoming call service 21 by using the Link module 23. In this way, the PC receives the operation indicating to answer the incoming call and can synchronize the operation to the mobile phone. After the super incoming call service 21 of the mobile phone receives the answer instruction, the procedure proceeds to S216.

S216: The super incoming call service 21 receives and processes call data.

S217-1: The super incoming call service 21 indicates the Link module 11 to send status change information to the PC.

S217-2: The Link module 11 sends the status change information to the Link module 23.

S217-3: The Link module 23 sends the status change information to the super incoming call service 21, to indicate to change a call status to "answering".

In some embodiments, after the super incoming call service 21 of the PC receives the status change information, the procedure proceeds to S218.

S218: The super incoming call service 21 sends a refresh instruction to the call UI.

S219: The call UI changes the incoming call interface.

In some embodiments, the call UI may change the incoming call interface UI to an incoming call answering interface, to indicate that the PC is collaborating to answer the incoming call corresponding to the mobile phone.

In some other embodiments, when the device 3 is the smart large screen, if a super incoming call function is not enabled or the do-not-disturb mode is enabled on the smart large screen, the smart large screen does not respond to a simultaneous ringing instruction sent by any device. If only a call transfer sub-function of the super incoming call function is enabled on the smart large screen, the smart large screen can only transfer a call, in other words, it is not supported that the smart large screen actively answers/hangs up the call, but the smart large screen can display an incoming call reminder. If the super incoming call function is enabled on the smart large screen, similarly to the PC, the smart large screen can collaborate on incoming call reminding, can also collaborate to answer the incoming call, and the like.

Figure 9:
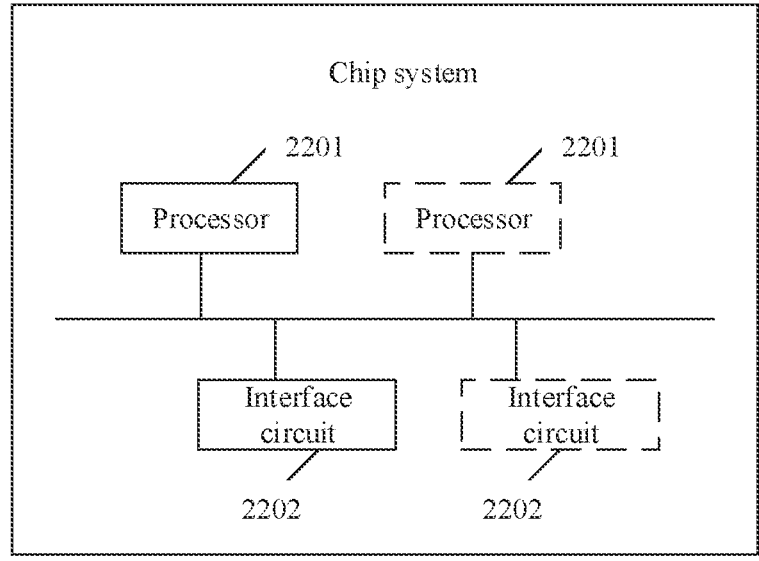
FIG. 9 is a schematic diagram of composition of a chip system according to an embodiment of this application.

An embodiment of this application further provides a chip system, and the chip system may be applied to the electronic device in the foregoing embodiment. As shown in FIG. 9, the chip system includes at least one processor 2201 and at least one interface circuit 2202. The processor 2201 may be a processor in the foregoing electronic device. The processor 2201 and the interface circuit 2202 may be interconnected by using a line. The processor 2201 may receive computer instructions from a memory of the foregoing electronic device by using the interface circuit 2202 and execute the computer instructions. When the computer instructions are executed by the processor 2201, the electronic device is enabled to perform the steps in the foregoing embodiment. Certainly, the chip system may further include other discrete devices. This is not specifically limited in embodiments of this application.

In some embodiments, it may be clearly understood by a person skilled in the art through descriptions of the foregoing implementations that, for ease and brevity of description, division of the foregoing functional modules is merely used as an example for description. In actual application, the foregoing functions may be allocated to different functional modules based on requirements, in other words, an internal structure of the apparatus is divided into different functional modules, to complete all or some of the functions described above. For a specific working process of the system, the apparatus, and the unit described above, refer to a corresponding process in the foregoing method embodiments. Details are not described herein again.

Functional units in embodiments of this application may be integrated into one processing unit, or each unit may exist alone physically, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of embodiments of this application. However, the protection scope of embodiments of this application is not limited thereto. Any change or replacement within the technical scope disclosed in embodiments of this application shall fall within the protection scope of embodiments of this application. Therefore, the protection scope of embodiments of this application shall be subject to the protection scope of the claims.

What is claimed is:

1. An incoming call reminder system, comprising:

one or more second devices; and a first device configured to receive a first incoming call request when the first device and the one or more second devices meet a first condition, wherein the first condition comprises a screen off state, wherein in response to the first incoming call request, a third device in the one or more second devices and the first device are configured to perform incoming call reminding, and a fourth device other than the third device in the one or more second devices does not perform vibration, ringing, or vibration on ring reminding, wherein the third device is a wearable device, and the third device is in a worn state, and wherein an incoming call reminder manner preconfigured in the fourth device is at least one of vibration or ringing.

2. The system of claim 1, wherein the first device receives a second incoming call request when the first device meets a second condition, wherein the second condition comprises detecting a user facial feature, receiving a user operation, or being in a screen on state, and wherein when an incoming call reminder manner preconfigured in the first device is at least one of vibration or ringing, in response to the second incoming call request, the first device performs reminding in the corresponding incoming call reminder manner, and the one or more second devices display incoming call notifications, and do not perform vibration, ringing, or vibration on ring reminding.

3. The system of claim 1, wherein the first device receives a third incoming call request when the first device meets a second condition, wherein the second condition comprises detecting a user facial feature, receiving a user operation, or being in a screen on state, and wherein a fifth device in the one or more second devices performs incoming call reminding in response to the third incoming call request when an incoming call reminder manner preconfigured in the first device is a mute notification, wherein an incoming call reminder manner of the fifth device is at least one of ringing or vibration on ring.

4. The system of claim 3, wherein when there are a plurality of fifth devices, the fifth device in the one or more second devices that performs incoming call reminding comprises one of the plurality of fifth devices having a highest priority.

5. The system of claim 3, wherein the fifth device performs incoming call reminding based on a third condition not being met, wherein the third condition comprises any one of the following:

a) running a first application in a foreground, wherein the first application is an application whose priority is greater than that of a call service;

b) executing a first task that comprises a collaborative task and a call task;

c) enabling a first function that indicates to block all incoming call requests in a first time period; and d) a first list preconfigured in the fifth device comprises the first device.

6. The system of claim 1, wherein the first device receives a fourth incoming call request when the first device meets the first condition and a seventh device in the one or more second devices meets a second condition, wherein the second condition comprises detecting a user facial feature, receiving a user operation, or being in a screen on state, and wherein the first device and the seventh device perform incoming call reminding in response to the fourth incoming call request.

7. The system of claim 1, wherein the first device receives a fourth incoming call request when the first device meets the first condition and a seventh device in the one or more second devices meets a second condition, wherein the second condition comprises detecting a user facial feature, receiving a user operation, or being in a screen on state, and wherein the first device, the third device, and the seventh device perform incoming call reminding in response to the fourth incoming call request.

8. The system of claim 7, wherein an eighth device other than the seventh device and the third device in the one or more second devices displays an incoming call notification in response to the fourth incoming call request.

9. The system of claim 1, wherein the third device is a smartwatch or a Bluetooth headset.

10. The system of claim 1, wherein the first device receives a fourth incoming call request when the first device meets the first condition and a seventh device in the one or more second devices meets a second condition, wherein the second condition comprises detecting a user facial feature, receiving a user operation, or being in a screen on state, wherein the first device performs incoming call reminding in response to the fourth incoming call request, wherein the first device sends first information to the seventh device when a priority of the seventh device is greater than that of the third device, wherein the first information indicates to the seventh device to perform incoming call reminding for the fourth incoming call request, wherein the seventh device sends first response information to the first device under a fourth condition, wherein the first response information indicates that the seventh device refuses to perform incoming call reminding for the fourth incoming call request, and the fourth condition is met when at least one of:

a first application runs in a foreground of the seventh device, and the first application is an application whose priority is greater than that of a call service;

the seventh device executes a first task that comprises a collaborative task and a call task;

a first function is enabled on the seventh device to indicate to block all incoming call requests in a first time period; and a first list of the seventh device comprises the first device, wherein the first device sends second information to the third device in response to the first response information, wherein the second information indicates to the third device to perform incoming call reminding for the fourth incoming call request, and wherein the third device performs incoming call reminding.

11. A method, applied to a first device, comprising:
receiving a first incoming call request;
sending third information to a third device in a group of one or more second devices when the first device and the one or more second devices meet a first condition, wherein the third information indicates to the third device to perform incoming call reminding for the first incoming call request, the third device is a wearable device, the third device is in a worn state, and the first condition comprises a screen off state; and
sending fourth information to a fourth device, wherein the fourth information indicates the fourth device to display an incoming call notification and not perform vibration, ringing, or vibration on ring reminding, the fourth device is a device other than the third device in the one or more second devices, and an incoming call reminder manner preconfigured in the fourth device is at least one of vibration or ringing.

12. The method of claim 11, further comprising:
receiving a second incoming call request;
sending fourth information to the second device when the first device meets a second condition and a preconfigured incoming call reminder manner is at least one of vibration or ringing, wherein the fourth information indicates to the second device to display an incoming call notification and not perform vibration, ringing, or vibration on ring reminding, and the second condition comprises detecting a user facial feature, receiving a user operation, or being in a screen on state; and
performing reminding through at least one of vibration or ringing in response to the second incoming call request when the preconfigured incoming call reminder manner is at least one of vibration or ringing.

13. The method of claim 11, further comprising:
receiving a third incoming call request; and
sending fifth information to a fifth device in the one or more second devices when the first device meets a second condition and a preconfigured incoming call reminder manner is a mute notification, wherein the fifth information indicates to the fifth device to perform incoming call reminding, an incoming call reminder manner preconfigured in the fifth device is ringing or vibration on ring, and the second condition comprises detecting a user facial feature, receiving a user operation, or being in a screen on state.

14. The method of claim 13, wherein when there are a plurality of fifth devices, sending the fifth information to the fifth device in the one or more second devices comprises sending the fifth information to one of the plurality of fifth devices having a highest priority.

15. The method of claim 11, further comprising:
receiving a fourth incoming call request; and
sending first information to a seventh device in the one or more second devices when the first device meets the first condition and the seventh device meets a second condition, wherein the first information indicates to the seventh device to perform incoming call reminding, and the second condition comprises detecting a user facial feature, receiving a user operation, or being in a screen on state.

16. The method of claim 15, further comprising:
receiving first response information from the seventh device, wherein the first response information indicates that the seventh device refuses to perform incoming call reminding for the fourth incoming call request; and
sending second information to the third device, wherein the second information indicates to the third device to perform incoming call reminding for the fourth incoming call request.

17. An electronic device, comprising:
one or more processors; and
one or more memories coupled to the one or more processors, the one or more memories configured to store instructions that, when executed by the one or more processors, cause the electronic device to be configured to:
receive a first incoming call request;
send third information to a third device in a group of one or more second devices when the electronic device and the one or more second devices meet a first condition, wherein the third information indicates to the third device to perform incoming call reminding for the first incoming call request, the third device is a wearable device, the third device is in a worn state, and the first condition comprises a screen off state; and send fourth information to a fourth device, wherein the fourth information indicates the fourth device to display an incoming call notification and not perform vibration, ringing, or vibration on ring reminding, the fourth device is a device other than the third device in the one or more second devices, and an incoming call reminder manner preconfigured in the fourth device is at least one of vibration or ringing.

18. The electronic device of claim 17, wherein when the one or more processors execute the instructions, the electronic device is further configured to:

receive a second incoming call request;

send fourth information to the second device when the electronic device meets a second condition and a preconfigured incoming call reminder manner is at least one of vibration or ringing, wherein the fourth information indicates to the second device to display an incoming call notification and not perform vibration or ringing or vibration on ring reminding, and the second condition comprises detecting a user facial feature, receiving a user operation, or being in a screen on state; and perform reminding through at least one of vibration or ringing in response to the second incoming call request when the preconfigured incoming call reminder manner is at least one of vibration or ringing.

19. The electronic device of claim 17, wherein when the one or more processors execute the instructions, the electronic device is further configured to:

receive a third incoming call request; and send fifth information to a fifth device in the one or more second devices when the electronic device meets a second condition and a preconfigured incoming call reminder manner is a mute notification, wherein the fifth information indicates to the fifth device to perform incoming call reminding, an incoming call reminder manner preconfigured in the fifth device is ringing or vibration on ring, and the second condition comprises detecting a user facial feature, receiving a user operation, or being in a screen on state.

20. The electronic device of claim 19, wherein when there are a plurality of fifth devices, sending the fifth information to the fifth device in the one or more second devices comprises sending the fifth information to one of the plurality of fifth devices having a highest priority.

* * * * *